(12) United States Patent
Usami et al.

(10) Patent No.: US 7,835,249 B2
(45) Date of Patent: Nov. 16, 2010

(54) OPTICAL RECORDING METHOD, OPTICAL RECORDING APPARATUS, OPTICAL RECORDING MEDIUM, OPTICAL REPRODUCING METHOD, AND OPTICAL REPRODUCING APPARATUS

(75) Inventors: Yoshihisa Usami, Kanagawa (JP); Kazuyuki Masukane, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 617 days.

(21) Appl. No.: 11/779,670

(22) Filed: Jul. 18, 2007

(65) Prior Publication Data

US 2008/0019252 A1     Jan. 24, 2008

(30) Foreign Application Priority Data

Jul. 21, 2006   (JP) .............................. 2006-199305

(51) Int. Cl.
  *G11B 7/0065* (2006.01)
(52) U.S. Cl. .............. 369/103; 369/112.17; 369/112.02
(58) Field of Classification Search ........................ None
  See application file for complete search history.

(56) References Cited

U.S. PATENT DOCUMENTS

| | | | |
|---|---|---|---|
| 2005/0264860 A1 | 12/2005 | Toishi | |
| 2006/0193232 A1* | 8/2006 | Redfield et al. | ............. 369/103 |
| 2007/0146838 A1 | 6/2007 | Toishi | |
| 2008/0180767 A1 | 7/2008 | Toishi | |

FOREIGN PATENT DOCUMENTS

| | | |
|---|---|---|
| EP | 1569209 A2 | 8/2005 |
| EP | 1821295 A2 | 8/2007 |
| JP | 2004-177958 A | 6/2004 |
| JP | 2005-293630 A | 10/2005 |
| JP | 2005-322382 A | 11/2005 |
| WO | 2007/043451 A1 | 4/2007 |

OTHER PUBLICATIONS

"Nikkey Electronics", Jan. 17, 2005, pp. 105-114.
Office Action dated Sep. 14, 2010 on corresponding Japanese Application No. 2006-199305.

* cited by examiner

*Primary Examiner*—Wayne R Young
*Assistant Examiner*—Brian Butcher
(74) *Attorney, Agent, or Firm*—Sughrue Mion, PLLC

(57) ABSTRACT

The present invention provides an optical recording method and an optical recording apparatus for holographically recording information allowing for reductions in uneven consumption of the material through the thickness of a recording layer during recording to achieve high density recording and an increased recording capacity, an optical recording medium, and an optical reproducing method and an optical reproducing apparatus using the optical recording method. The optical recording method includes irradiating the optical recording medium with an information beam and a reference beam, dividing at least one of the information beam and the reference beam into two or more between a light source thereof and an optical recording medium, and adjusting the optical path lengths of the divided information beams and reference beams so that they focus on points different from each other through the thickness of the recording layer.

14 Claims, 16 Drawing Sheets

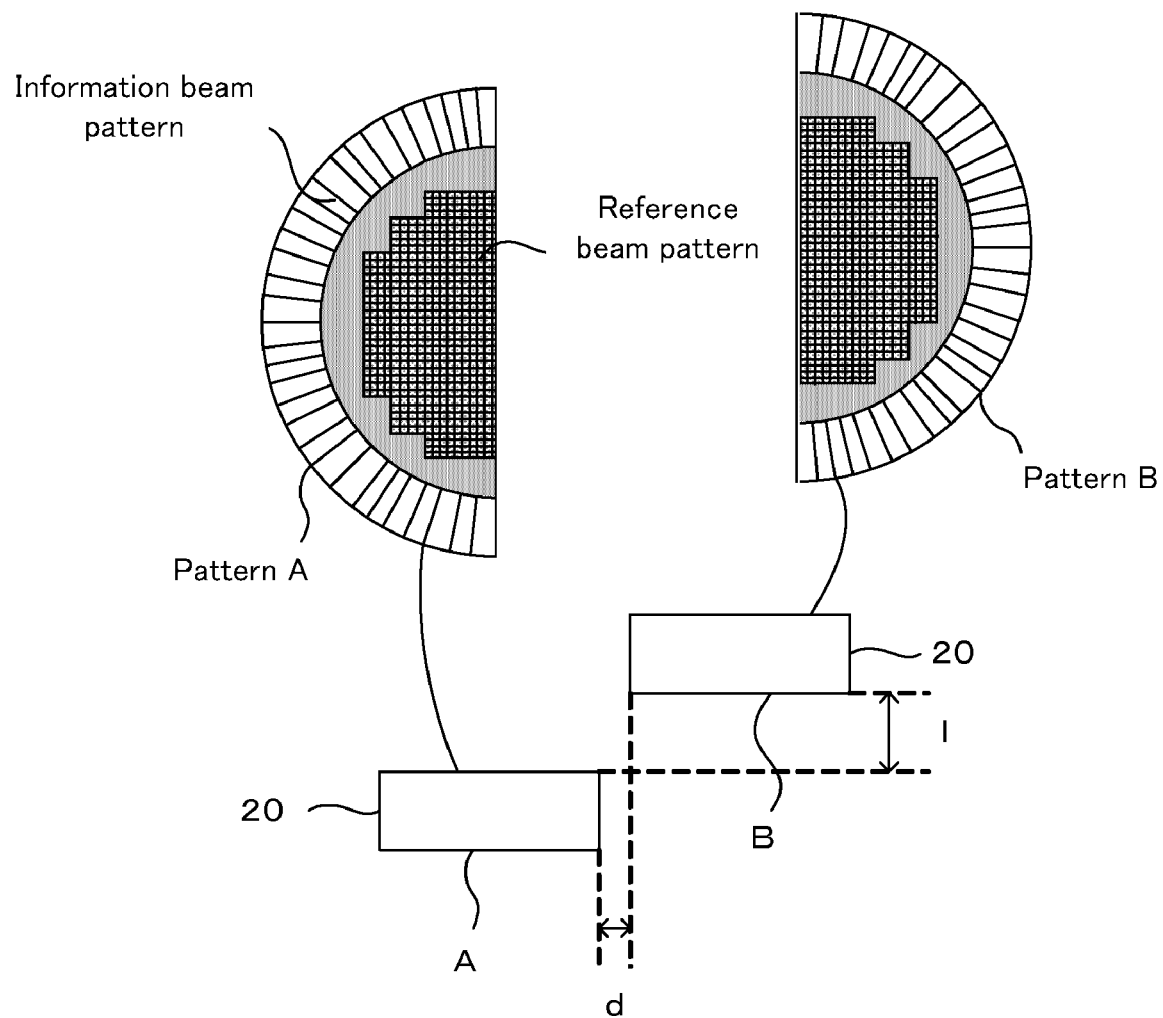

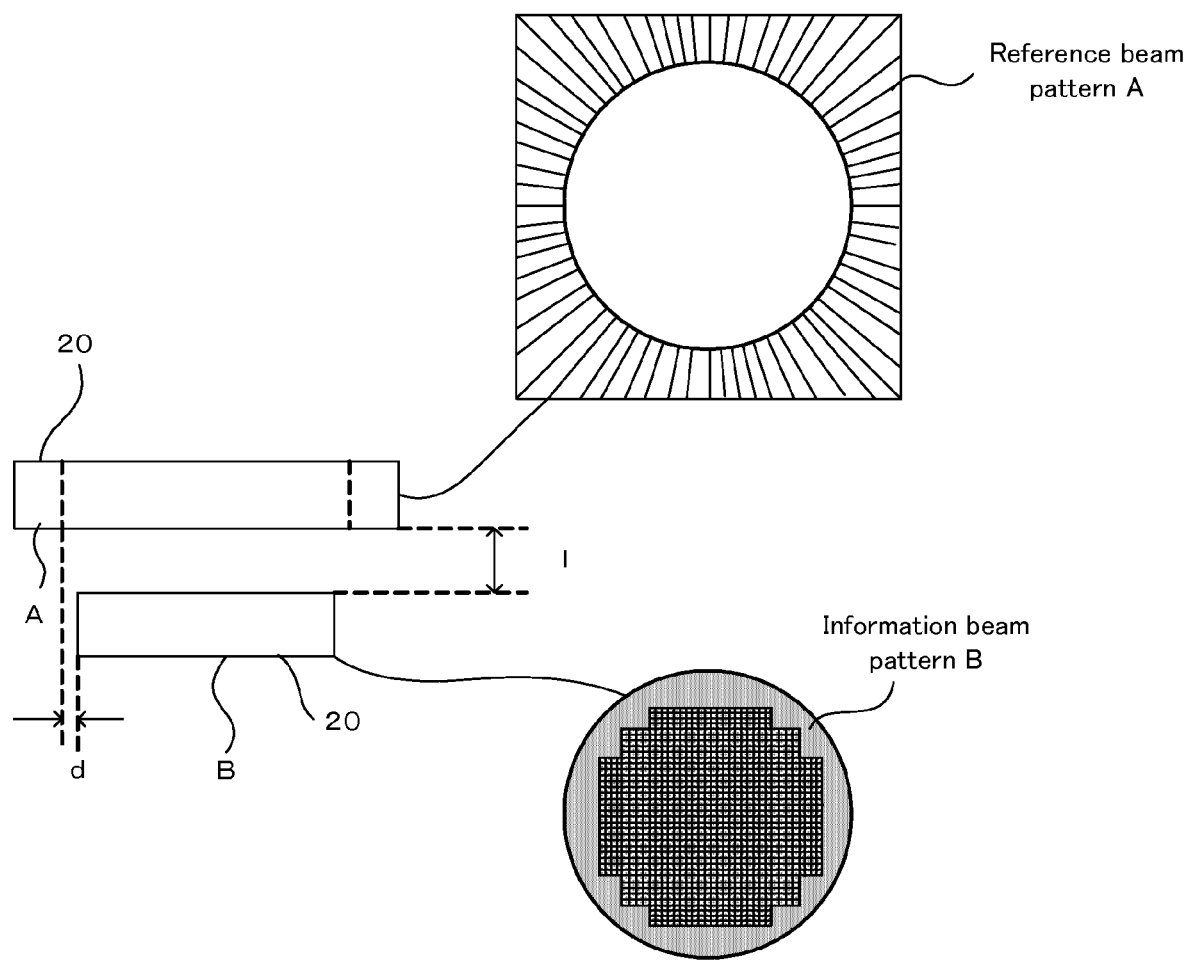

Prior Art

OPTICAL RECORDING METHOD, OPTICAL RECORDING APPARATUS, OPTICAL RECORDING MEDIUM, OPTICAL REPRODUCING METHOD, AND OPTICAL REPRODUCING APPARATUS

BACKGROUND OF THE INVENTION

1. Field of the Invention

The present invention relates to an optical recording method and an optical recording apparatus for holographically recording information in which uneven consumption of the material through the thickness of a recording layer during recording is reduced so as to achieve high density recording and high multiple recording, an optical recording medium for recording by the optical recording method so that information recorded in a large volume and at high density is reproduced with efficiency, and an optical reproducing method and an optical reproducing apparatus for reproducing information recorded by the optical recording method in an efficient and excellent manner.

2. Description of the Related Art

Optical recording methods for holographically recording information on optical recording media generally utilize interference of an information beam (an object beam) carrying image information with reference beam within the optical recording media, interference fringes generated being written in the optical recording media. Such optical recording methods include a colinear system in which the information beam and the reference beam are emitted with their axes being coaxially aligned. In the colinear system, the information beam and the reference beam generate interference fringes, whereby image information is recorded in the recording layer. The recorded image information is reproduced by irradiating the optical recording medium with the same beam as the reference beam in the same direction as during the recording. Upon irradiation, diffracted light is generated from the interference fringes and received for producing the information.

Among techniques for increasing the optical information recording capacity is a multiple recording system in which the recording density of interference fringes is increased. Such recording systems include the shift-multiple recording, angle-multiple recording, wavelength-multiple recording, and phase-multiple recording.

Among them, the shift-multiple recording in which information is additionally recorded or overwritten on top of initially recorded information while shifting the emitted light or the optical recording medium little by little in a horizontal plane direction in relation to the recording layer is highly compatible with the disc recording such as CD and DVD in which the disc is rotated for recording and excellent in random accessing, thereby being used in the colinear system using a single lens for recording (see "NIKKEY ELECTRONICS," Jan. 17, 2005, pp 105-114).

In the shift-multiple recording using the colinear system, as shown in FIG. 8, an information beam and a reference beam 34 emitted from a pick-up irradiate an optical recording medium 23 via an objective lens 12. The information beam and the reference beam 34 are collected in a form of an inverted cone of a specific size within a recording layer 4. Then, information is holographically recorded as an interference fringe of the inverted cone form in the recording layer 4. Following the holographic recording, the optical recording medium 23 or the pick-up is horizontally moved in the arrowed direction (the circumferential direction of the optical recording medium) in FIG. 8. Then, the information beam and the reference beam 34 irradiate a different region from the recorded region in the recording layer 4 for the subsequent holographic recording, sequentially conducting multiple recording.

However, the above multiple recording along with the horizontal movement allows for forming only one interference fringe through the thickness of the recording layer, limiting an increase in recording capacity.

In the meanwhile, a recording method using a combination of angle-multiple recording and shift-multiple recording in the two-beam interference system is disclosed (see the Japanese Patent Application Laid-Open (JP-A) No. 2004-177958). In this recording method, the incident angles of the information beam and the reference beam to the recording layer of a still optical recording medium are gradually changed for achieving multiple recording of information through the thickness of the recording layer. Following the multiple recording through the thickness, the optical recording medium is rotated for conducting multiple recording of information through the thickness in a new region of the photosensitive layer. In this way, multiple holographic recording is conducted not only in the horizontal direction but also through the thickness of the recording layer, thereby increasing the recording capacity.

In both of the above methods, as shown in FIG. 8, the information beam and the reference beam 34 are collected in the form of an inverted cone within the recording layer 4; therefore, the beam diameter varies according to the depth through the recording later 4. In other words, the beam diameter is large near the entrance and smaller near the focal point. Therefore, the light density is low in the area where the beam diameter is large (termed the upper part of the recording layer in some occasion hereafter) and increased as the beam diameter is reduced. Particularly, the light density is high near the vertex of the cone (termed the lower part of the recording layer in some occasion hereafter), where optical reaction is accelerated and the recording layer material such as monomers is exhausted. In contrast, the recording layer material is less consumed in the area where the beam diameter is large. Therefore, the recording layer material is subject to uneven consumption through the thickness of the recording layer.

Furthermore, no more recording is available in the area where the material is exhausted. Then, the next recording has to be moved to an area that does not overlap with that area, which results in not much recording in the horizontal direction. The recording layer material is wasted and the recording density is reduced. A limitation is imposed in increasing the recording capacity.

Therefore, an optical recording method and an optical recording apparatus for holographically recording information in which uneven consumption of the material through the thickness of the recording layer during recording is reduced so as to achieve a high recording density and an increased recording capacity, an optical recording medium for recording by the optical recording method so that information recorded in a large volume and at high density is reproduced with efficiency, and an optical reproducing method and an optical reproducing apparatus for reproducing information recorded by the optical recording method in an efficient and excellent manner have not been realized yet and currently demanded to be provided.

BRIEF SUMMARY OF THE INVENTION

The present invention resolves the above conventional problems and has the objective of providing an optical recording method and an optical recording apparatus for holographically recording information in which uneven consumption of the material through the thickness of the recording layer during recording is reduced so as to achieve a high recording density and an increased recording capacity, an optical recording medium for recording by the optical recording method so that information recorded in a large volume and at high density is reproduced with efficiency, and an optical reproducing method and an optical reproducing apparatus for reproducing information recorded by the optical recording method in an efficient and excellent manner.

The unit to resolve the above problems include the following.

The optical recording method of the present invention is an optical recording method for recording information on an optical recording medium having a recording layer in which information is holographically recoded by irradiating the optical recording medium with an information beam and a reference beam, characterized by the fact that at least one of the information beam and the reference beam is divided into two or more between the light source of the information beam and reference beam and the optical recording medium and the optical path lengths of the divided information beams and reference beams are adjusted so that they focus on points different from each other through the thickness of the recording layer.

In the above optical recording method, at least one of the information beam and the reference beam is divided into two or more between the light source of the information beam and reference beam and the optical recording medium and the optical path lengths of the divided information beams and reference beams are adjusted so that they focus on points different from each other through the thickness of the recording layer, whereby the light density is distributed and one piece of recording information is divided and recorded in multiple regions through the thickness of the recording layer. Because of the light density distributed, each recording region has a low light density; therefore, differences in consumption of the recording layer material between the positions through the thickness are reduced and excessive consumption of the recording layer material per one recording is prevented. Intervals between adjacent holographically recorded images can be reduced, while increasing the recording density.

The optical recording apparatus has a light source, and a unit configured to divide at least one of an information beam and a reference beam into two or more between the light source of the information beam and reference beam and an optical recording medium and adjust the optical path lengths of the divided information beams and reference beams so that they focus on points different from each other through the thickness of the recording layer, wherein the optical recording medium comprises a recording layer in which information is holographically recorded by irradiating the optical recording medium with the information beam and the reference beam.

In the optical recording medium of the present invention, information is recorded by the optical recording method of the present invention.

The optical reproducing method of the present invention includes irradiating with a reproduction beam that is the same as a reference beam used during recording an interference image formed on a recording layer in an optical recording medium by the optical recording method of the present invention, receiving diffracted light generated upon the irradiation by a light receiving unit, and reproducing recorded information based on the interference image.

The optical reproducing apparatus is equipped with a light source, a light receiving unit, and an optical reproducing unit configured to irradiate with a reproduction beam that is the same as a reference beam used during recording an interference image formed on a recording layer in an optical recording medium by an optical recording apparatus, receive diffracted lights generated upon the irradiation at the light receiving unit to reproduce recorded information based on the interference image, any of the following units, a unit A configured to divide a reproduction beam into two or more between the light source of the reproduction beam and optical recording medium and adjust the optical path lengths of the divided reproduction beams so that they focus on points different from each other through the thickness of a recording layer; and a unit B configured to adjust the optical path lengths of diffracted lights each having a different optical path length between the optical recording medium and the light receiving unit so that they focus on the same plane of the light receiving unit.

BRIEF DESCRIPTION OF THE SEVERAL VIEWS OF THE DRAWINGS

FIG. 4A is a side view showing an embodiment of the spatial light modulator used in the present invention.

FIG. 4C is a side view showing an embodiment of the spatial light modulator used in the present invention.

Figure 1:
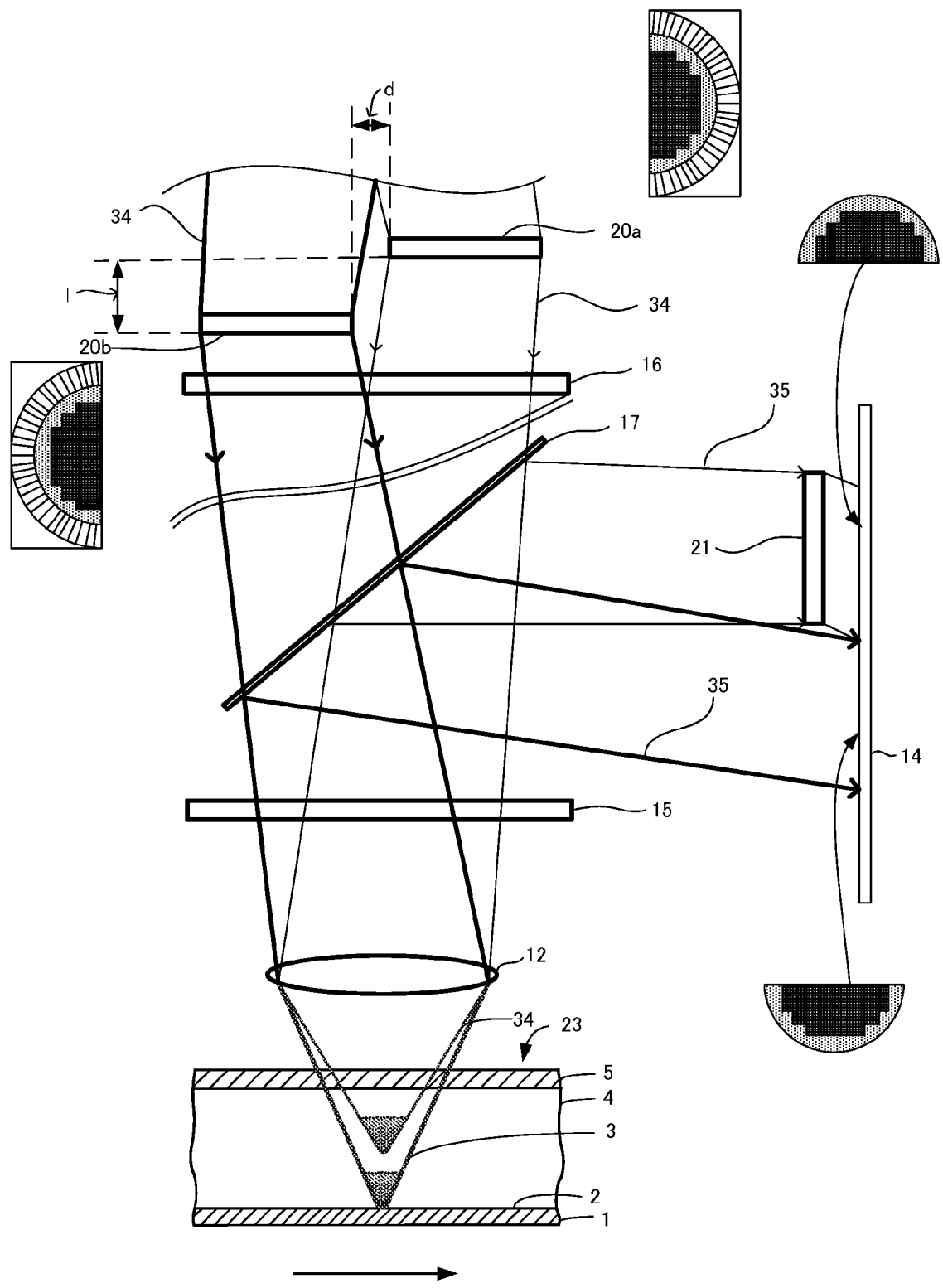
FIG. 1 is an explanatory illustration showing an embodiment of the optical system used in the optical recording method and optical reproducing method of the present invention.

DETAILED DESCRIPTION OF THE INVENTION (Optical Recording Method and Optical Recording Apparatus)

The optical recording method of the present invention includes at least an optical recording step and an optical path length adjusting step and further includes other steps such as a servo control step and a fixing step where necessary.

The optical recording apparatus of the present invention has at least an optical recording unit and an optical path length adjusting unit and further has other unit such as a servo control unit and a fixing unit where necessary.

It is preferable that the optical recording method of the present invention is used in the colinear optical recording method in which the information beam and the reference beam are emitted with their axes being coaxially aligned. The explanation below is made for the colinear system. However, the optical recording method of the present invention is not limited to the colinear system and applicable to other optical recording such as two-beam interference optical recording.

The optical recording method of the present invention can be realized by the optical recording apparatus of the present invention. The details of the optical recording apparatus will be clarified as the steps of the optical recording method are explained.

[Optical Recording Step]

The optical recording step is a step of irradiating the optical recording medium having a recording layer in which information is holographically recoded with an information beam and a reference beam to record information.

The optical recording step can be realized by the optical recording unit of the optical recording apparatus of the present invention.

<Information Beam and Reference Beam>

The information beam and reference beam are not particularly limited and appropriately selected according to the purpose. Preferably, they are, for example, coherent laser beams emitted from a light source(s).

The above laser beams are not particularly limited and appropriately selected according to the purpose. For example, laser beams of one or more wavelengths selected from 300 nm to 850 nm can be used. The wavelength is preferably 300 nm to 800 nm, more preferably 350 nm to 700 nm, and most preferably 400 nm to 600 nm because the center of visible range is most visible.

When the wavelength is smaller than 300 nm, it is difficult to design an optical system. When the wavelength is larger than 800 nm, the recording capacity may be reduced. The wavelength can be any of 405 nm, 605 nm, and 780 nm.

The laser beam source is not particularly limited and appropriately selected according to the purpose. For example, a solid-state laser beam oscillator, a semiconductor laser beam oscillator, a liquid laser beam oscillator, and a gas laser beam oscillator can be used. Among them, a gas laser beam oscillator and a semiconductor laser beam oscillator are preferable and a semiconductor laser beam oscillator is particularly preferable because it is light and small and has excellent electric power efficiency.

The emission method of the information beam and the reference beam is not particularly limited and appropriately selected according to the purpose. For example, a laser beam emitted from a single light source is divided to use as the information beam and the reference beam or two laser beams from different light sources can be used for irradiation.

The emission direction of the information beam and the reference beam is not particularly limited and appropriately selected according to the purpose. For example, the information beam and the reference beam are preferably emitted with their optical axes being coaxially aligned. The term "coaxial" means that the information beam and the reference beam pass through the same optical system. The information beam and reference beam are emitted to the recording region in the recording layer of the optical recording medium with a specific angle for holographic recording.

The information beam (object beam) and reference beam interfere with each other within the optical recording medium and interference fringes generated at the time are written in the optical recording medium to record the information.

The angle between the information beam and the reference beam is preferably 25° to 90°, more preferably 35° to 80°, further preferably 40° to 70°, and particularly preferably 45° to 60°. The angles smaller than 25° or larger than 90° may cause insufficient signal intensities.

Information to be recorded in the information beam is processed into digital data, for example, for each irradiated spot in the case of colinear system. Approximately 4,000-bit data is formed as a page data pattern in one irradiated spot. If information to be recorded in a specific optical recording medium is image information, the screen is finely divided into pixels, the minimum unit of two-dimensional pattern data, by a spatial light modulator (SLM). Following the processing stated above, the image information is subjected to digital computer processing using a Fourier transform in which time signals are expressed by frequency ranges to obtain digital data consisting of "0" and "1."

For example, as shown in FIG. 1, passing through an objective lens 12, the information beam consisting of the above digital data is collected in the manner that it is divided into two or more in a recording region of a recording later 4 within an optical recording medium 23, which is described later in detail with regard to the optical path length adjusting step, and focuses on points different from each other through the thickness of the recording layer 4. Holographic recording (recording of interference fringes 3) is conducted in each collected light-irradiated spot.

Following the recording, the irradiation unit of the information beam and the reference beam 34 or the optical recording medium 23 is horizontally shifted by a specific distance, where the information beam and the reference beam 34 are emitted to the recording layer 4 and divided through the thickness of the recording layer 4 for holographic recording. In this way, a multiple recording is conducted in sequence.

In FIG. 1, the arrow indicates the circumferential direction of the optical recording medium 23.

[Optical Path Length Adjusting Step]

The optical path length adjusting step is a step of dividing at least one of the information beam and the reference beam into two or more between the light source of the information beam and reference beam and the optical recording medium and adjusting the optical path lengths of the divided information beams and reference beams so that they focus on points different from each other through the thickness of the recording layer.

The optical path length adjusting step is realized by the optical path length adjusting unit of the optical recording apparatus.

In the optical path length adjusting step, at least one of the information beam and the reference beam is divided into two or more between the light source of the information beam and reference beam and the optical recording medium. For example, in the case of colinear system, the information beam and the reference beam are coaxially emitted; therefore, both of the information beam and the reference beam can be divided into two or more, or the information beam and the reference beam can be divided into two, the information beam and the reference beam, or the information beam and the reference beam each can be further divided. In the case of two-beam interference system in which the information beam and the reference beam are separately emitted, only the information beam can be divided into two or more or only the reference beam can be divided into two or more. Alternatively, the information beam and the reference beam each can be divided into two or more.

With the above division, in the case of colinear system as shown in FIG. 1, the information beam and the reference beam focus on points different from each other through the thickness of the recording layer via the objective lens; consequently, one piece of recoding information is divided and recorded in multiple regions through the thickness of the recording layer 4.

Figure 6:
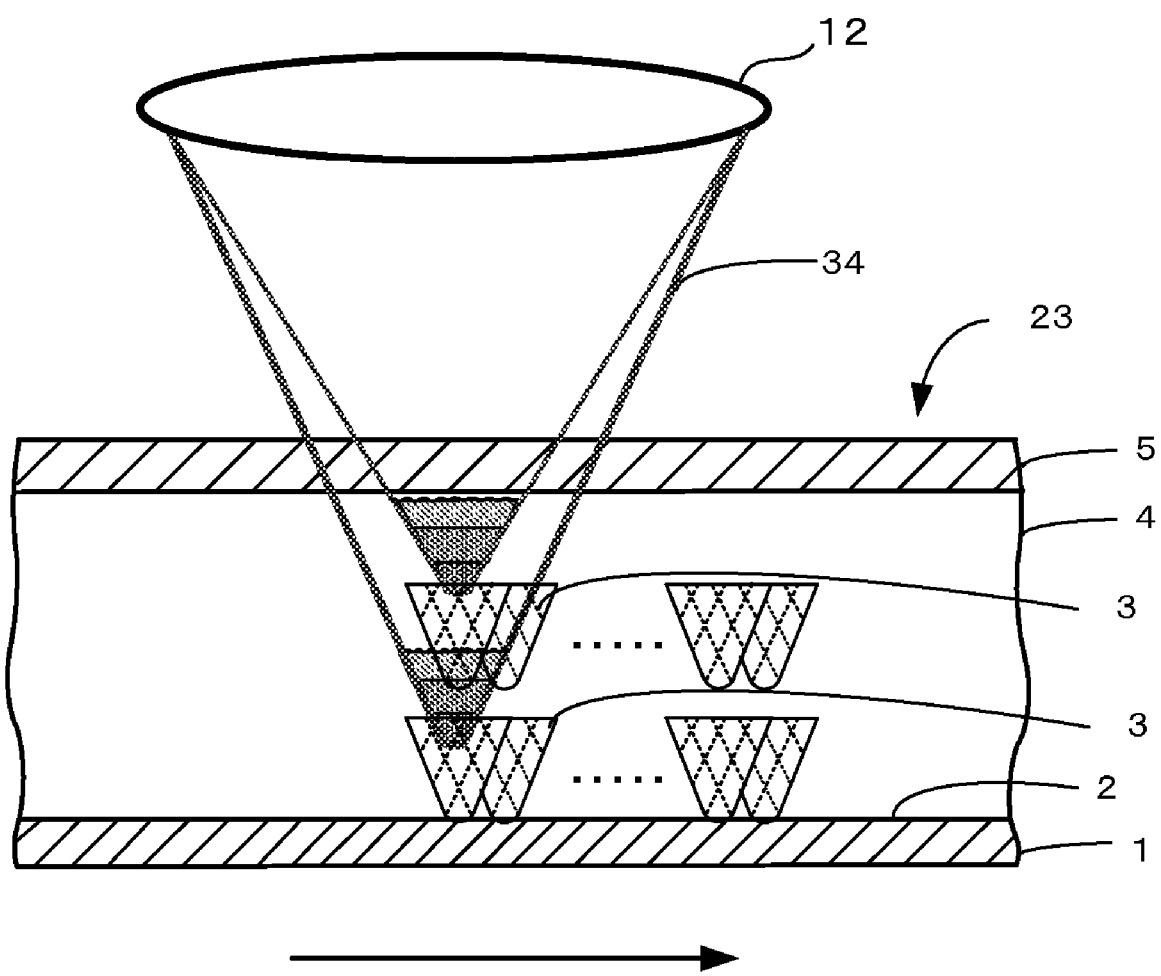
FIG. 6 is a schematic illustration showing multiple recording according to the optical recording method of the present invention.

The light density is distributed because of the division and the light density at each focal point is reduced. Therefore, differences in consumption of the recording layer material between positions through the thickness of the recording layer are reduced and excessive consumption of the recording layer material in one recording is prevented. Hence, intervals between adjacent holographic recordings (interference fringes 3) in multiple recording can be reduced. In addition to multiple recording in the horizontal direction of the recording layer, the shifting through the thickness of the recording layer allows a new recording on top of an already recorded interference fringe 3 as shown in FIG. 6. Multiple recording available through the thickness and in the horizontal direction of the recording layer significantly increases the recording capacity of an optical recording medium. In FIGS. 1 and 6, the arrow indicates the circumferential direction of the optical recording medium.

—Optical Path Length Adjusting Unit—

The adjustment method of the optical path lengths is not particularly limited and appropriately selected according to the purpose. For example, it is preferably to use at least one optical path length adjusting unit provided between the light source of the information beam and reference beam and the optical recording medium.

The optical path length adjusting unit is not particularly limited and appropriately selected according to the purpose. For example, a focal point adjusting member and a spatial light modulator are preferably used. Other members also can be used as long as the optical path lengths can be adjusted. Among them, a focal point adjusting member is more preferable because of its simple configuration and low cost.

The focal point adjusting member and spatial light modulator can be used individually or in a combination of the two or more.

—Focal Point Adjusting Member—

Preferable focal point adjusting members include plate members such as lenses, prisms, and optical plates. These members preferably have a refractive index of 1.4 or higher. When they have a refractive index lower than 1.4, the optical path lengths may not successfully be adjusted.

The thickness of the focal point adjusting member is preferably 10 µm to 10 mm and more preferably 50 µm to 5 mm. When the thickness is smaller than 10 µm, the focal point adjusting member may not be able to maintain the profile accuracy. When the thickness is larger than 10 mm, distorted images may be obtained because of inhomogeneous forming materials.

Preferable materials of the focal point adjusting member include glass, polycarbonates, acryl, and amorphous polyolefin. Among them, glass and acryl are more preferable. These can be used individually or in a combination of two or more.

The focal point adjusting member preferably has an antireflection layer at least on one side and preferably on both sides for preventing reflection of the information beam and the reference beam.

The antireflection layer is preferably formed by an inorganic multilayer interference film.

—Spatial Light Modulator—

The spatial light modulator is not particularly limited and appropriately selected according to the purpose. For example, a liquid crystal plate, DMD, and mechanical shutter are preferable. Among them, a DMD is more preferable.

The optical path length adjustment rate is preferably 1 µm to 1,000 µm, more preferably 10 µm to 500 µm, and further preferably 50 µm to 300 µm. When the adjustment rate is less than 1 µm, the distance between the focal points at different positions within the recording layer is small and the efficacy of a high density may not be achieved. When the adjustment rate is more than 1,000 µm, the recording layer has to have an excessively large thickness, which may cause difficulty in formation of the recording layer or yield a spherical aberration.

The optical path length can easily be adjusted, for example, using an optical path length adjusting unit having on its light emitting surface points that are at different distances from the optical recording medium and more preferably an optical path length adjusting unit having surfaces that are at different distances from the optical recording medium.

The way to achieve different distances from the optical recording medium is not particularly limited and appropriately selected according to the purpose. For example, a focal point adjusting member or a spatial light modulator is used and a step may be provided on the light emitting surface. Alternatively, an optical path length adjusting unit can be placed obliquely in relation to the light emission direction.

The difference in distance "l" from the optical recording medium between the points or surfaces that are at different distances from the optical recording medium corresponds to the optical path length adjustment rate. The distance "l" is preferably 1 μm to 1,000 μm, more preferably 10 μm to 500 μm, and further preferably 50 μm to 300 μm as described above.

The optical path length can be adjusted by providing two or more optical path length adjusting units at positions that are at different distances from the optical recording medium, providing a step on the light emitting surface as described above, or providing two or more obliquely arranged optical path adjusting units in the light emission direction.

The distance "l" in the light emission direction between the two or more optical path adjusting units corresponds to the optical path length adjustment rate. The distance "l" is preferably 1 μm to 1,000 μm, more preferably 10 μm to 500 μm, and further preferably 50 μm to 300 μm as described above.

In the present invention, the light emitting surface is a surface of the optical path length adjusting unit on the exit side or on the side to the optical recording medium or a light receiving unit when light having an optical path length adjusted by the optical path length adjusting unit exits from the optical path length adjusting unit to the optical recording medium or to the light receiving unit, which is described later.

When the focal length adjusting member is used, the optical path length adjustment rate L can be calculated as follows:

$$L=(n-i)\times t$$

in which "n" is the refractive index of the focal length adjusting member, "i" is the refractive index of the air, which is one or 1, and "t" is the thickness of the focal length adjusting member. The unit for L depends on the unit for the thickness (for example, L is in mm when "t" is in mm and L is in μm when "t" is in μm).

The above L is preferably 1 μm to 1,000 μm, more preferably 10 μm to 500 μm, and further preferably 50 μm to 300 μm.

The distance "d" in the direction intersecting with the light emission direction between two or more optical path length adjusting units provided at different positions and the total width D across all optical path length adjusting units preferably satisfy d/D=1/1,000 to 1/2, more preferably 1/500 to 1/5, and further preferably 1/100 to 1/10.

The value d/D smaller than 1/1,000 sometimes makes multiple recording difficult. The value d/D larger than 1/2 sometimes makes the optical system excessively larger.

Embodiments of Spatial Light Modulator and Focal Length Adjusting Member

FIGS. 3A to 3E and FIGS. 4A to 4D show embodiments of the spatial light modulator and FIGS. 5A to 5K show embodiments of the focal length adjusting member. However, the present invention is not limited thereto.

Embodiments of Spatial Light Modulator

In FIGS. 3A to 3E, the light emitting surface of a spatial light modulator has points (or surfaces) that are at different distances from optical recording medium.

Figure 3A:
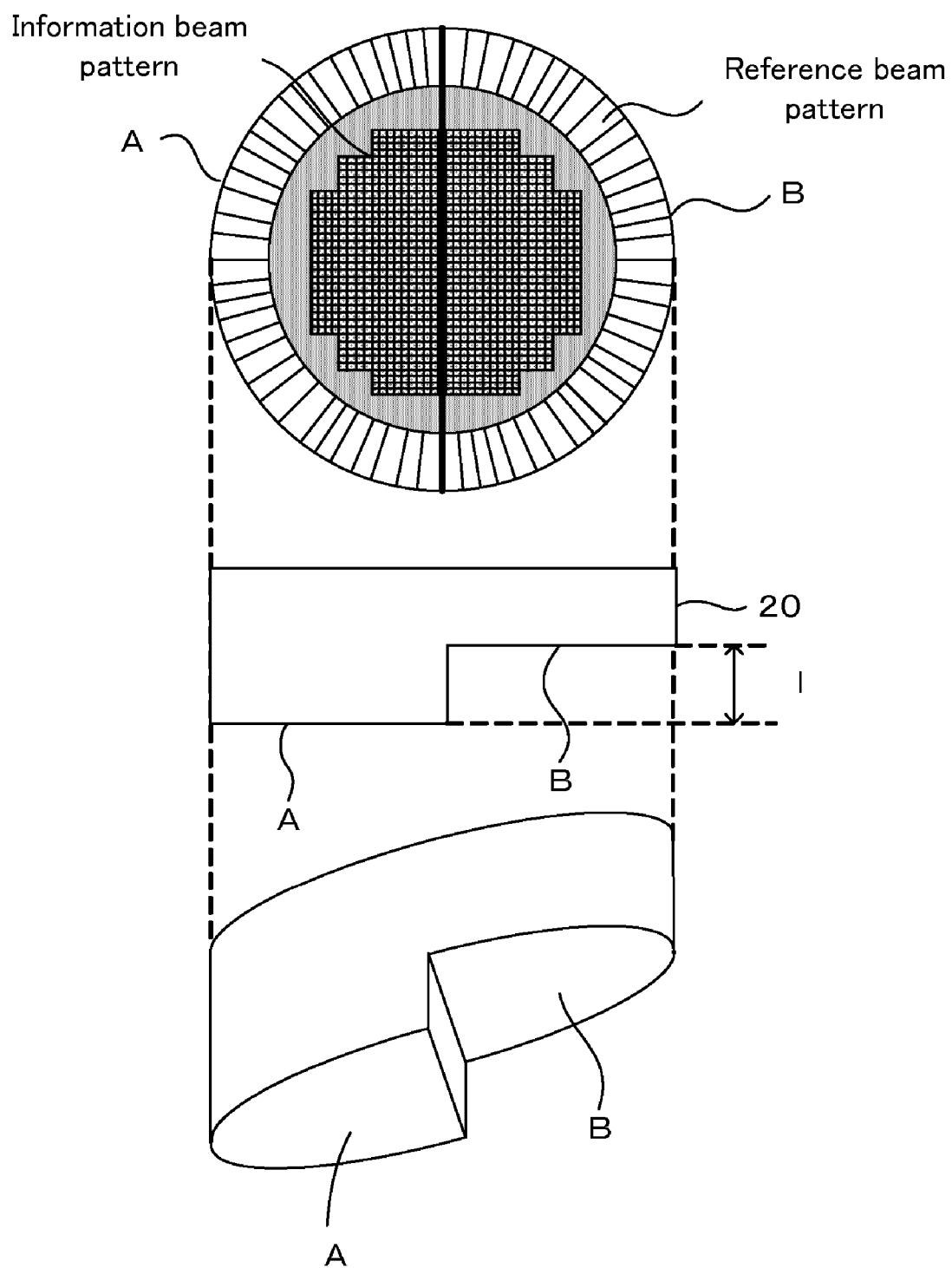
FIG. 3A is a side view showing an embodiment of the spatial light modulator used in the present invention.

In FIG. 3A, a spatial light modulator 20 has a step on the light emitting surface so that the pattern for producing information beam and reference beam is horizontally (or vertically) divided into two, a pattern A and a pattern B. An information beam and a reference beam corresponding to one pattern A is generated and emitted by one light emitting surface A and information beam and reference beam corresponding to the other pattern B is generated and emitted by the other light emitting surface B.

Figure 3B:
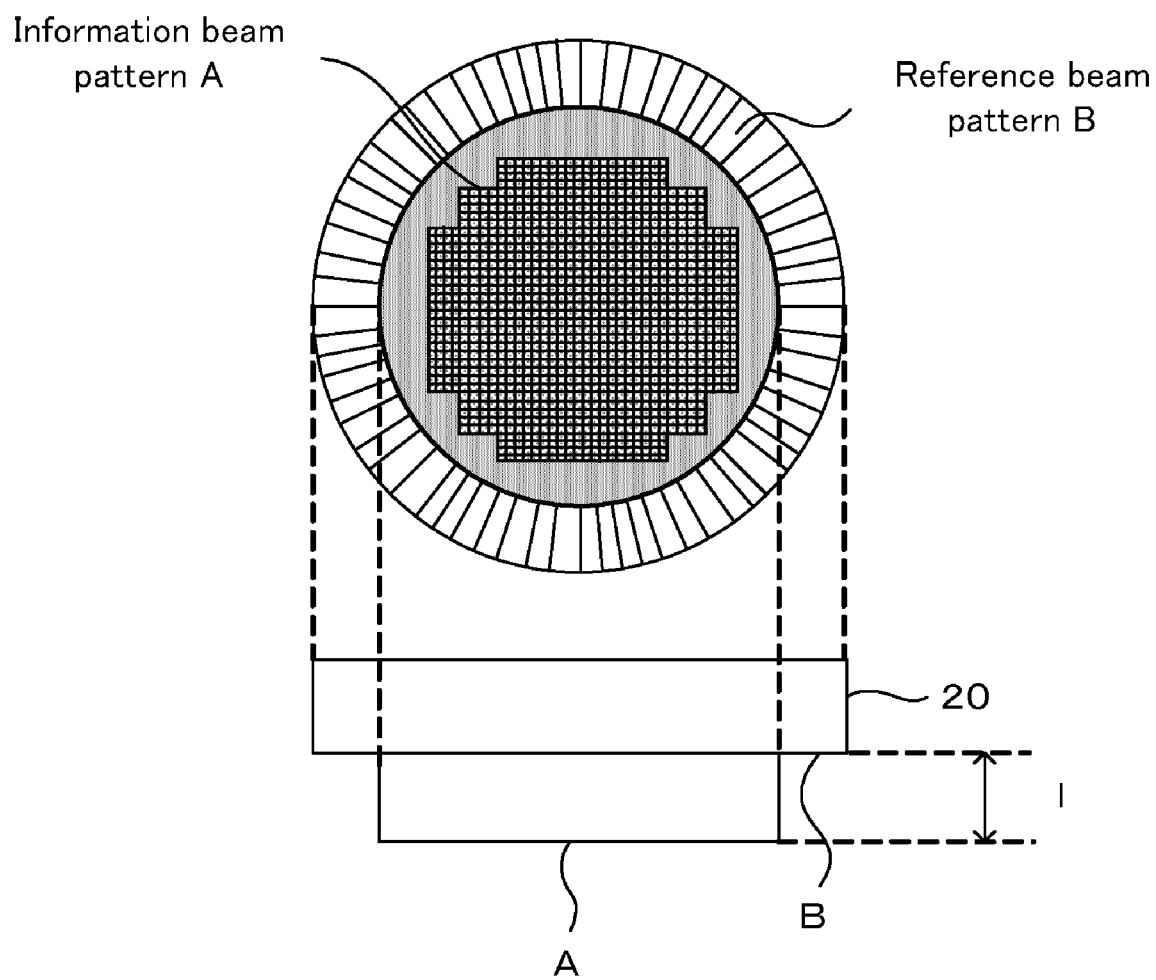
FIG. 3B is a side view showing an embodiment of the spatial light modulator used in the present invention.

In FIG. 3B, using a circular pattern, a spatial light modulator 20 has a step to create a central information beam pattern A area and a peripheral reference beam pattern B area, whereby the information beam and the reference beam are adjusted to have different optical path lengths from each other before they irradiate the optical recording medium.

Figure 3C:
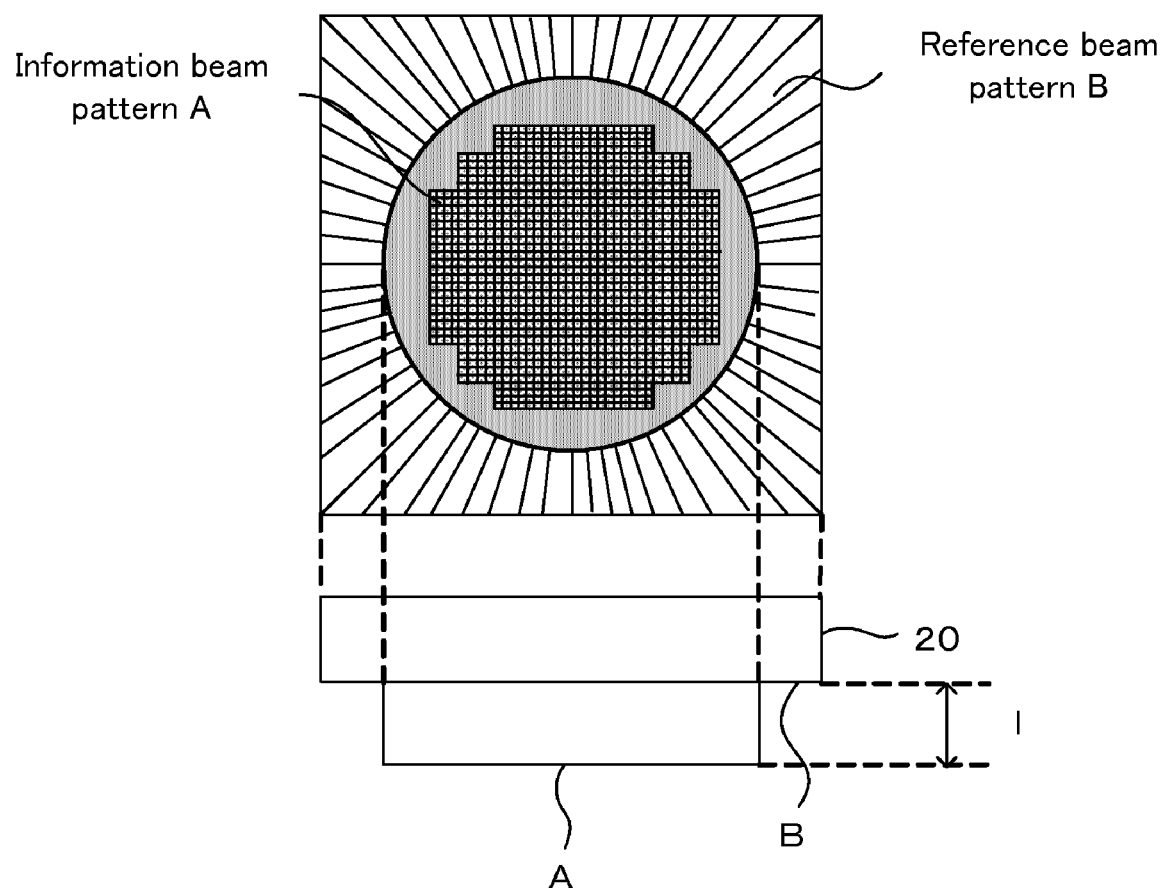
FIG. 3C is a side view showing an embodiment of the spatial light modulator used in the present invention.

In FIG. 3C, using a square pattern, a spatial light modulator 20 has a step to create a central information beam pattern A area and a peripheral reference beam pattern B area, whereby the information beam and the reference beam are adjusted to have different optical path lengths from each other before they irradiate the optical recording medium.

Figure 3D:
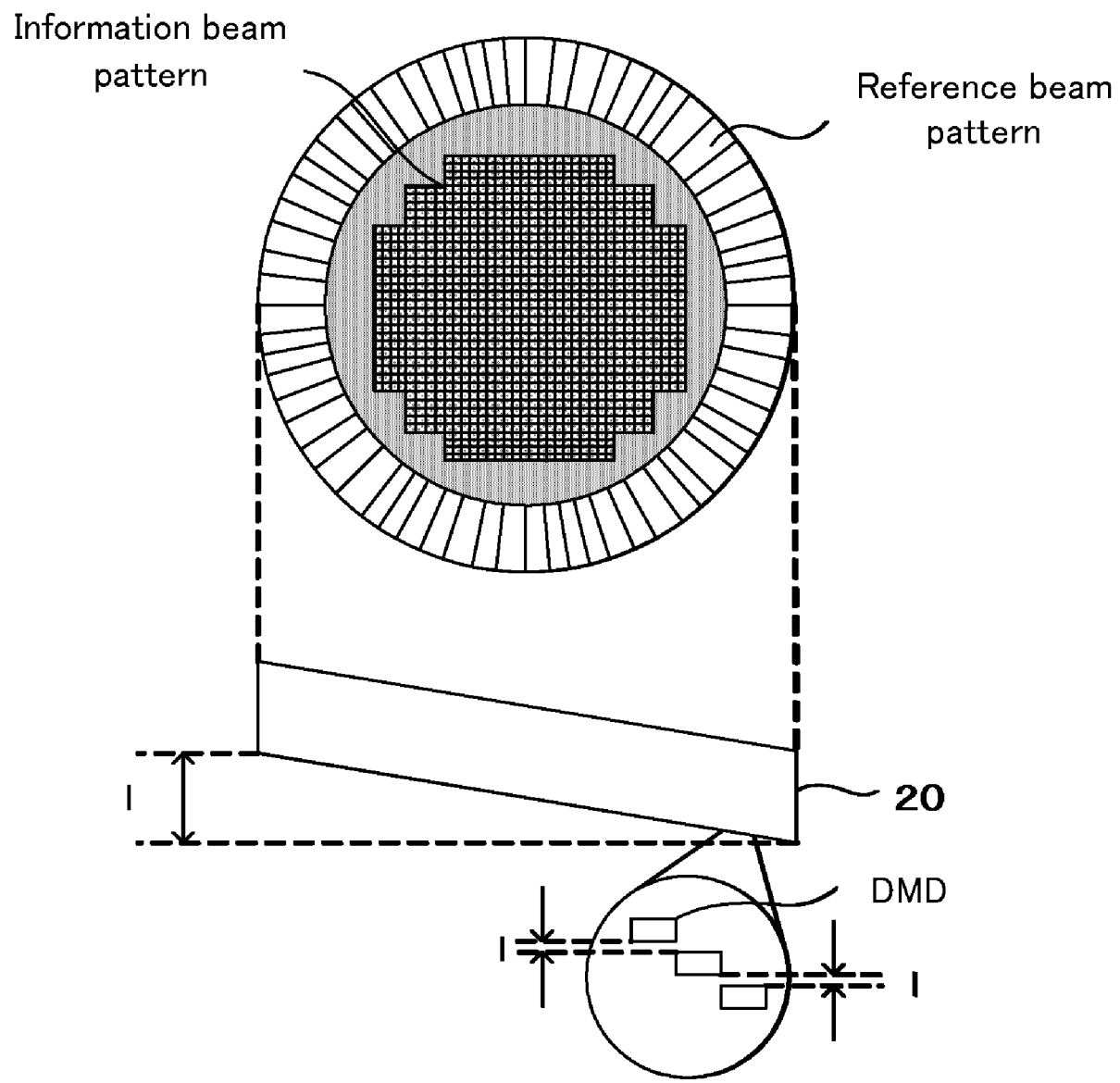
FIG. 3D is a side view showing an embodiment of the spatial light modulator used in the present invention.

In FIG. 3D, a spatial light modulator 20 is placed obliquely in relation to the light emission direction, whereby points that are at different distances from the optical recording medium are provided. Specifically, as shown in an enlarged view within a circle of FIG. 3D, multiple digital micromirror devices (DMDs) constituting the spatial light modulator 20 are provided stepwise in the light emission direction, whereby the spatial light modulator 20 is provided obliquely. The distances "l" between the light emitting surfaces can be equal to or different from each other. With this structure, the spatial light modulator 20 has points that are at different distances from the optical recording medium for the respective DMDs, whereby the optical path lengths of the information beam and the reference beam can be adjusted.

Figure 3E:
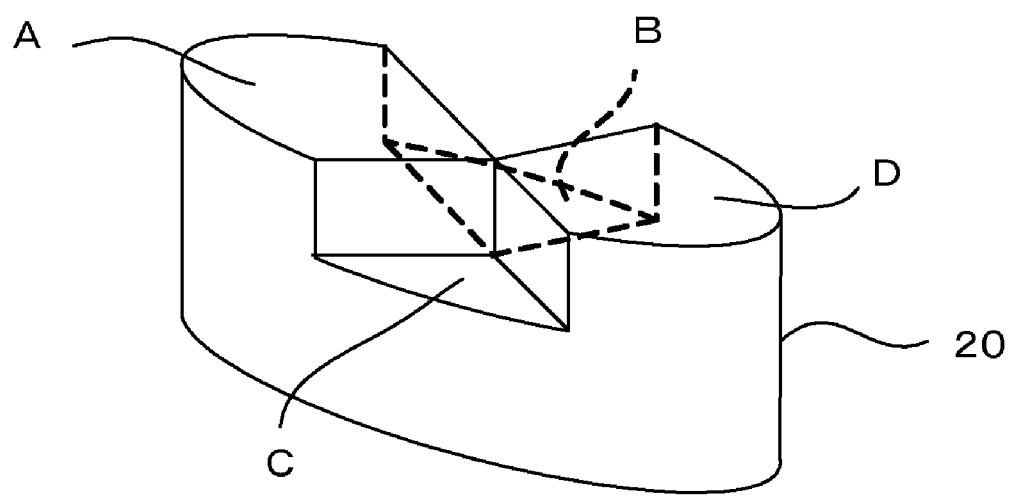
FIG. 3E is a side view showing an embodiment of the spatial light modulator used in the present invention.
Figure 3E:
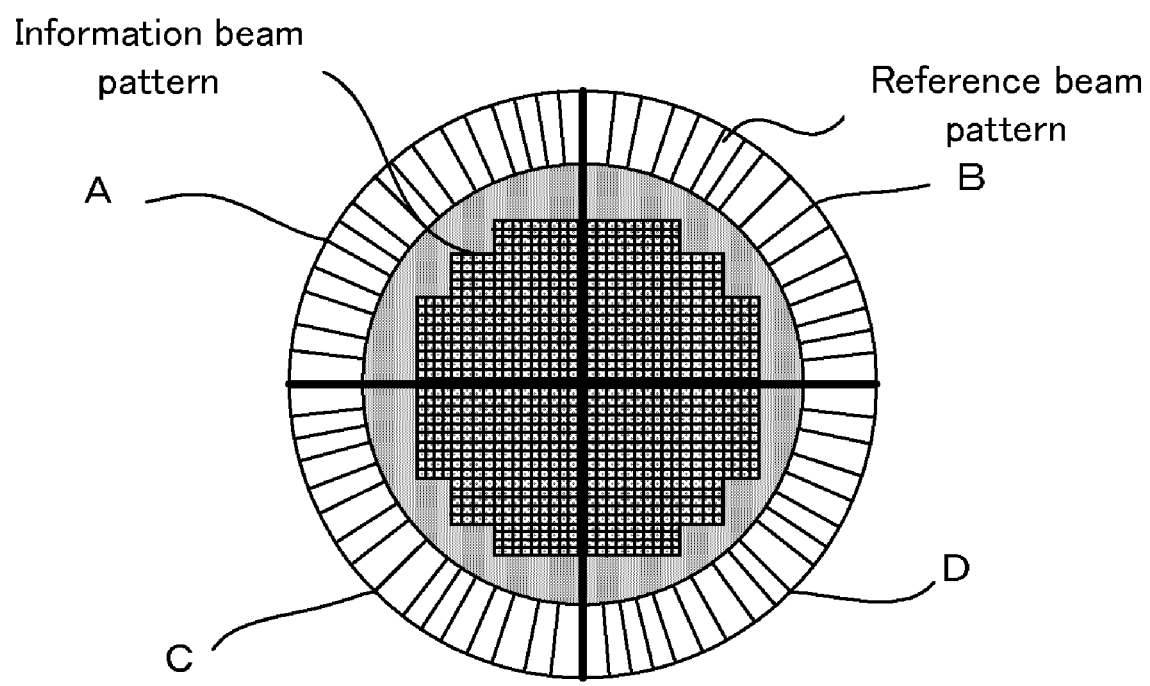

In FIG. 3E, the pattern for creating information beam and reference beam is divided into four divisions symmetric about a point (patterns A, B, C, and D). The facing surfaces A and D on the light emitting surface of a spatial light modulator 20 is on the same plane and the facing surfaces B and C are on the same plane. In addition, the surfaces A and D protrude toward the optical recording medium more than the surfaces B and C to create a step on the light emitting surface, whereby the information beam and the reference beam are adjusted to have different optical path lengths.

In FIGS. 4A to 4D, two spatial light modulators 20 are used to divide the information beam and the reference beam into two, whereby they are each adjusted to have different optical path lengths.

In FIG. 4A, two semicircular spatial light modulators 20 each consisting of an information beam pattern and a reference beam pattern are placed at a distance "l" in the light emission direction and at a distance "d" in the intersecting direction. With this structure, the spatial light modulators 20 divide the pattern of information beam and reference beam into two, A and B, whereby the information beam and the reference beam corresponding to the pattern A and the information beam and the reference beam corresponding to the pattern B are adjusted to have optical path lengths different from each other before irradiation.

Figure 4B:
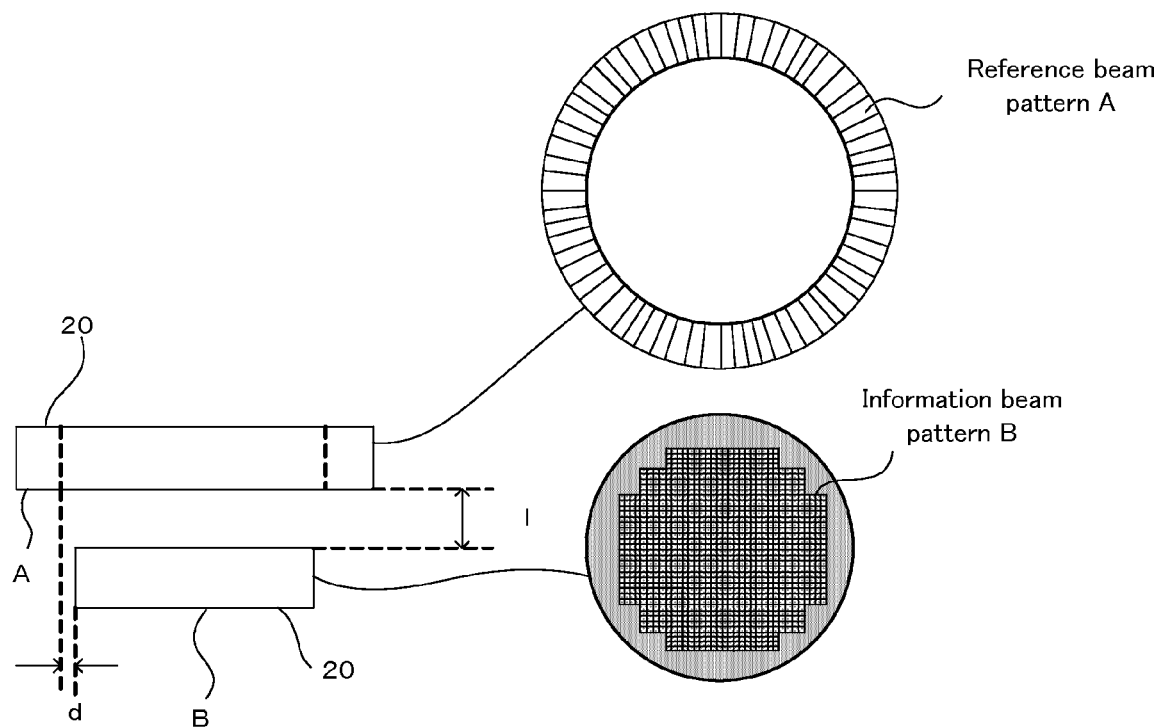
FIG. 4B is a side view showing an embodiment of the spatial light modulator used in the present invention.

In FIG. 4B, using a circular pattern, a spatial light modulator 20 for creating a reference beam pattern A and a spatial light modulator 20 for creating an information beam pattern B are separately formed. They are placed at a distance "l" in the light emission direction. Furthermore, as shown in FIG. 4B, the two spatial light modulators 20 are positioned with the inner circumference of the annular reference beam pattern A and the outer circumference of the circular information beam pattern B being spaced by a distance "d" to prevent their pixels from overlapping with each other. With this structure, the information beam and the reference beam can be adjusted to have optical path lengths different from each other before they irradiate the optical recording medium.

In FIG. 4C, using a square pattern in a similar manner to in FIG. 4B, a spatial light modulator 20 for creating a reference beam pattern A and a spatial light modulator 20 for creating an information beam pattern B are separately formed. They are placed at a distance "l" in the light emission direction. Furthermore, they are positioned with the inner circumference of the reference beam pattern A and the outer circumference of the circular information beam pattern B being spaced by a distance "d". With this structure, the information beam and the reference beam can be adjusted to have optical path lengths different from each other before they irradiate the optical recording medium.

Figure 4D:
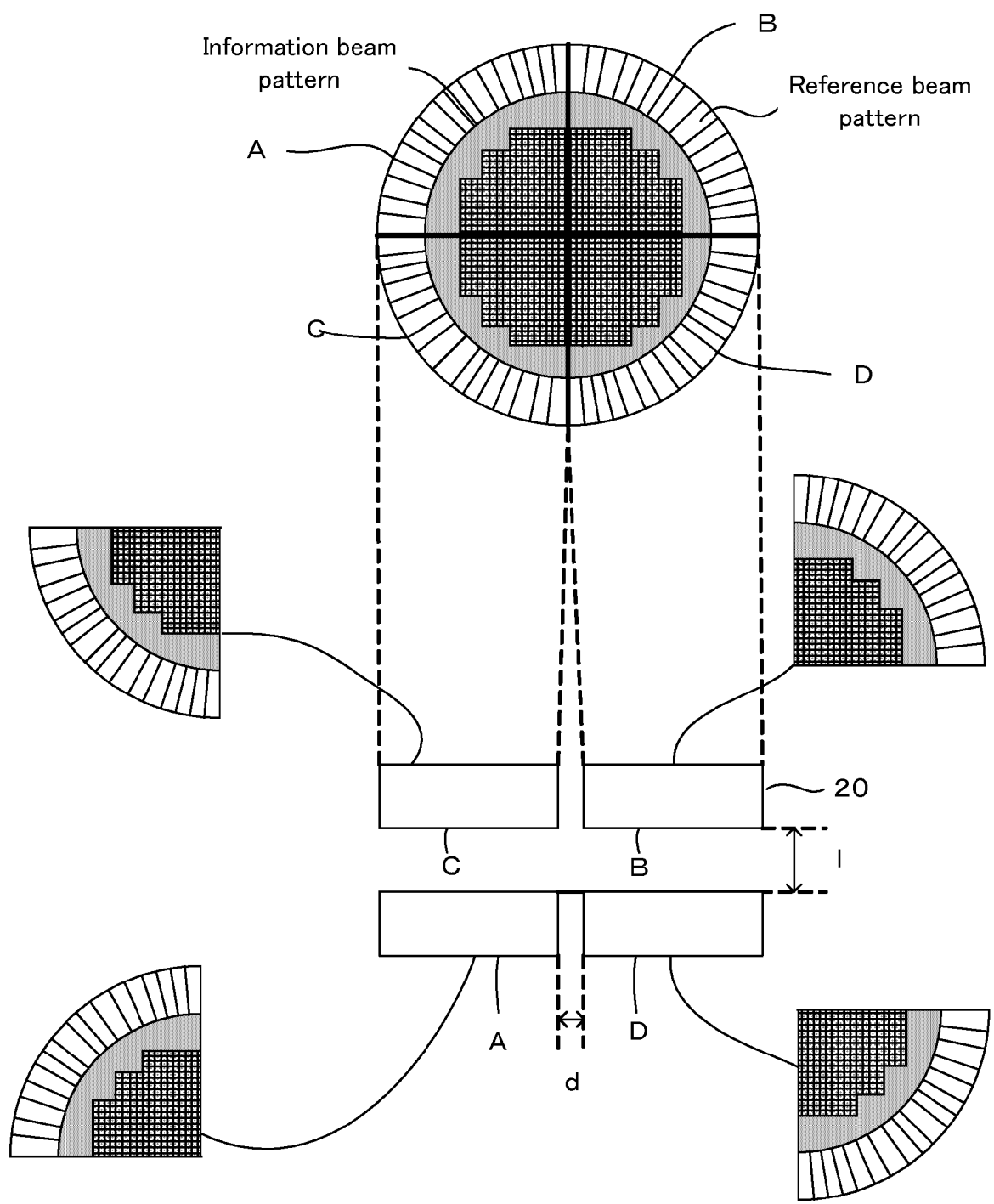
FIG. 4D is a side view showing an embodiment of the spatial light modulator used in the present invention.

In FIG. 4D, four spatial light modulators 20 are alternately positioned to divide the pattern for creating information beam and reference beam into four divisions (patterns A, B, C, and D) symmetric about a point. The facing spatial light modulators 20 for the patterns A and C are at the same distance from the optical recording medium. Spaced from them by a distance "l" are the facing spatial light modulators 20 for the patterns B and C. The adjacent spatial light modulators 20 are apart from each other by a distance "d" in the direction intersecting with the light emission direction. With this structure, the information beam and the reference beam are divided into four to adjust their optical path lengths.

Embodiments of the Focal Length Adjusting Member

Figure 5A:
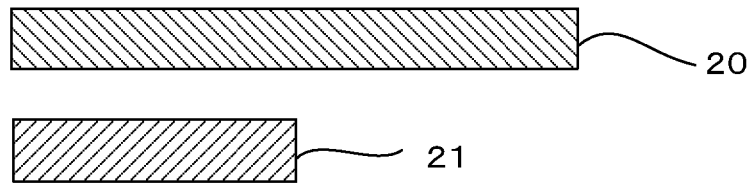
FIG. 5A is a cross-sectional view showing an embodiment of the focal length adjusting member used in the present invention.

In FIG. 5A, a focal length adjusting member 21 having a width approximately half the width of the spatial light modulator 20 is provided on the optical path of the information beam and the reference beam emitted from the spatial light modulator 20. With this focal length adjusting member 21 being provided, the optical path lengths of nearly a half of the information beam and the reference beam can be adjusted before they irradiate the optical recording medium.

Figure 5B:
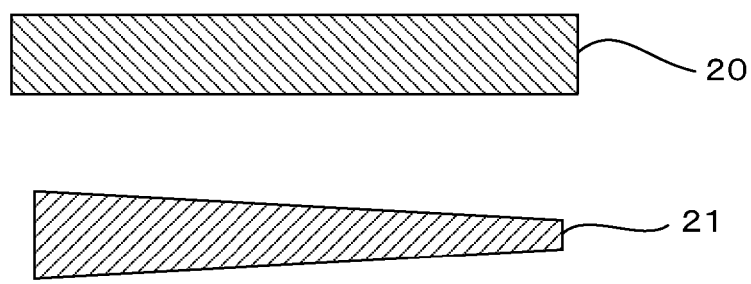
FIG. 5B is a cross-sectional view showing an embodiment of the focal length adjusting member used in the present invention.

In FIG. 5B, a focal length adjusting member 21 having nearly the same width as the spatial light modulator 20 and a varied thickness along the width is provided on the optical path of the information beam and the reference beam. This focal length adjusting member 21 has on both sides a surface oblique to the information beam and the reference beam emission direction. Therefore, a number of points that are at different distances from optical recording medium are formed, whereby the information beam and the reference beam are divided into multiple lights having different optical path lengths.

Figure 5C:
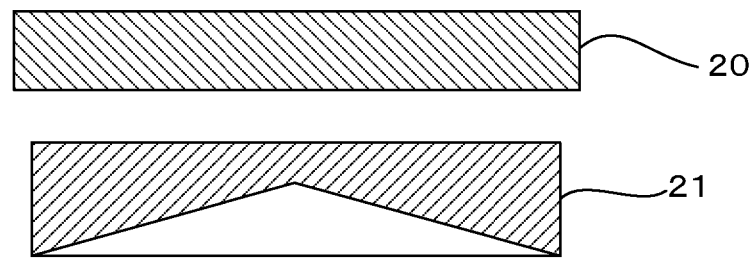
FIG. 5C is a cross-sectional view showing an embodiment of the focal length adjusting member used in the present invention.
Figure 5D:
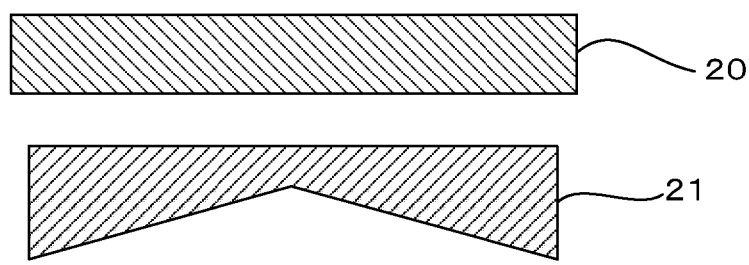
FIG. 5D is a cross-sectional view showing an embodiment of the focal length adjusting member used in the present invention.

In FIGS. 5C and 5D, a focal length adjusting member 21 having an inclined surface of a V-shaped cross-section as the light emitting surface for the information beam and the reference beam is used to adjust the optical path lengths of the information beam and the reference beam. The light emitting surface is cut out into a cone shape to form an inclined surface in FIG. 5C. In the meanwhile, V-shaped linear grooves are formed to create an inclined surface in FIG. 5D.

Figure 5E:
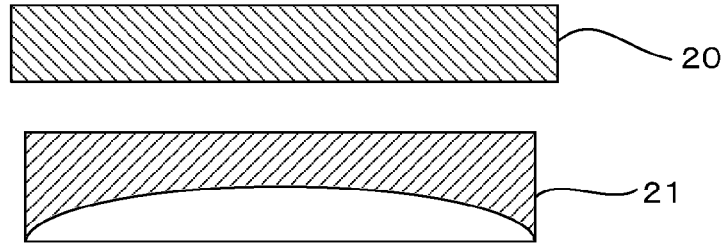
FIG. 5E is a cross-sectional view showing an embodiment of the focal length adjusting member used in the present invention.
Figure 5F:
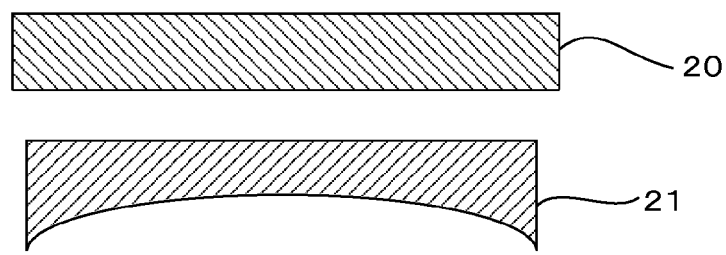
FIG. 5F is a cross-sectional view showing an embodiment of the focal length adjusting member used in the present invention.

In FIGS. 5E and 5F, a focal length adjusting member 21 having a concave surface of an arc-like cross-section as the light emitting surface for the information beam and the reference beam is provided. A spherical concave surface is formed in FIG. 5E. In the meanwhile, arc-like grooves are formed to create a concave surface in FIG. 5F.

Figure 5G:
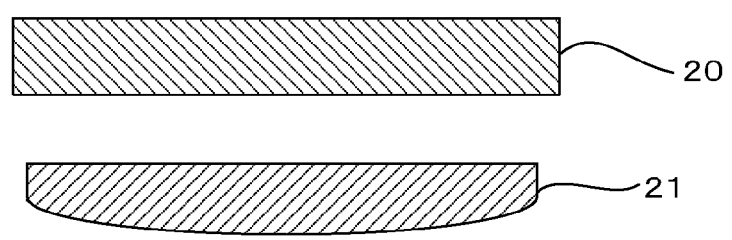
FIG. 5G is a cross-sectional view showing an embodiment of the focal length adjusting member used in the present invention.

In FIG. 5G, a focal length adjusting member 21 having a convex surface of an arc-like cross-section as the light emitting surface for the information beam and the reference beam is provided.

Figure 5H:
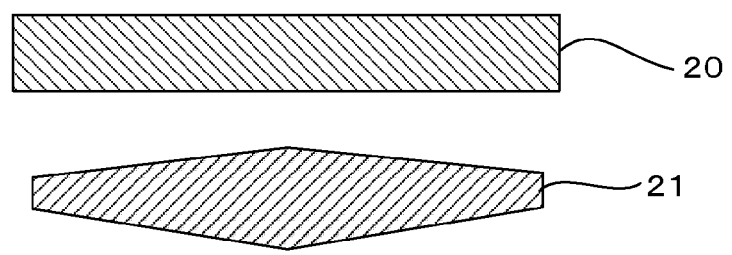
FIG. 5H is a cross-sectional view showing an embodiment of the focal length adjusting member used in the present invention.

In FIG. 5H, a focal length adjusting member 21 having a thickness that is the largest in the center and decreased toward the periphery to form a convex surface on both sides is provided. The convex surface can be a curved cone or consist of two planes.

Figure 5I:
FIG. 5I is a cross-sectional view showing an embodiment of the focal length adjusting member used in the present invention.

In FIG. 5I, a focal length adjusting member 21 having a large thickness on one side of the center of the light emitting surface and a smaller thickness on the other side to create a step on the light emitting surface is provided.

Figure 5J:
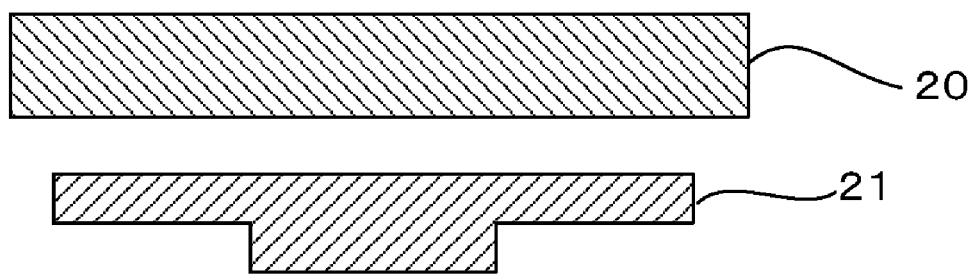
FIG. 5J is a cross-sectional view showing an embodiment of the focal length adjusting member used in the present invention.

In FIG. 5J, a focal length adjusting member 21 having a large thickness in the center and a smaller thickness on the periphery to create a step on the light emitting surface is provided.

Figure 5K:
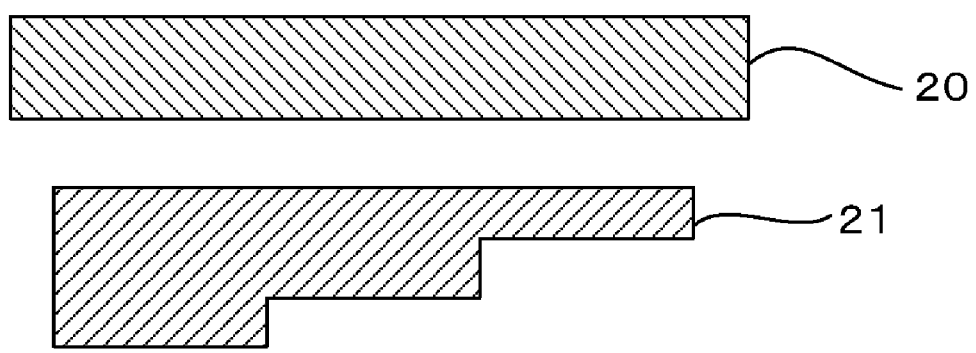
FIG. 5K is a cross-sectional view showing an embodiment of the focal length adjusting member used in the present invention.

In FIG. 5K, a focal length adjusting member 21 having three different thicknesses to create steps on the light emitting surface is provided. The steps (namely, a distance "l") can be equal to or different from each other in magnitude.

The above focal length adjusting members 21 can be used individually or in a combination of two or more. They can be circular or rectangular.

[Servo Control Step]

The servo control step is a step of irradiating the optical recording medium with servo light and receiving diffracted light from the optical recording medium for recording position determination (tracking servo), focal length adjustment (focusing servo), and other servo controls. Generally, these controls are performed concurrently with the recording in the optical recording step (in other words, the recording is performed along with the servo controlling).

The servo control step is performed by the servo control unit of the optical recording apparatus.

For the servo control, information for focusing and tracking servo controls by the sampled servo system and address information are previously recorded in emboss pit (servo pit) patterns (preformat). The focusing servo control can be done using the reflecting surface of a reflecting coating. For example, wobble pits can be used as information for the tracking servo control.

The tracking servo control is not particularly limited and appropriately selected according to the purpose. For example, servo controls for detecting track positions by the three-beam method, push-pull method, phase difference detection method (described in "Illustrated Reading Book on Compact Discs," Ohmsha, by Heitaro Nakajima and Hiroshi Ogawa, First Edition, published on Nov. 10, 1986) can be used.

The focusing servo control is not particularly limited and appropriately selected according to the purpose. For example, servo controls for detecting focusing by the astigmatism method, Foucault method, and critical angle method (described in "Illustrated Reading Book on Compact Discs," Ohmsha, by Heitaro Nakajima and Hiroshi Ogawa, First Edition, published on Nov. 10, 1986) can be used.

Alternatively, a holographic memory in which focal point information including track information and address information, and focal length information indicating the distance between the collective lens and the focal point of the recording light is recorded is recorded in the optical recording medium and the information in the holographic memory can be read to determine the information-recording track position or the circumferential recording position and adjust the focal length.

The position irradiated with the information beam and the reference beam can be servo controlled using the servo pit pattern to rotate and shift the position to be irradiated with the information beam and the reference beam following the irradiated position.

The tracking control and focusing control unit are not particularly limited and appropriately selected according to the purpose. For example, a servo mechanism can be used.

The servo mechanism is not particularly limited and appropriately selected according to the purpose. For example, a mechanism for generating focusing error signals based on the above shift and directing a driving unit to move the objective lens via a phase compensation drive amplifier that amplifies the signals for controlling the focal length can be used.

The above driving unit is not particularly limited and appropriately selected according to the purpose. For example, an actuator or a stepping motor can be used.

The servo control light wavelength is not particularly limited and appropriately selected according to the purpose. The wavelength is preferably different from those of the information beam and the reference beam. Specifically, the wavelength is preferably any of 350 nm to 500 nm, 620 nm to 700 nm, and 750 nm to 1,000 nm, more preferably any of 390 nm to 440 nm, 640 nm to 690 nm, and 770 nm to 900 nm, and further preferably any of 400 nm to 420 nm, 650 nm to 680 nm, and 780 nm to 830 nm. Among them, any of 405 nm, 650 nm, and 780 nm is particularly preferable and 405 nm is most preferable.

The track pitch of the servo pit pattern is not particularly limited and appropriately selected according to the purpose. For example, when the servo control light wavelength is 620 nm to 700 nm, the track pitch is preferably 0.85 μm to 30 μm, more preferably 1.1 μm to 20 μm, particularly preferably 1.3 μm to 10 μm, and most preferably 1.5 μm to 2 μm. When the track pitch is smaller than 0.85 μm, the tracking may be unstable because of scattered light in the middle of the recording layer. When the track pitch is larger than 30 μm, the recording density may be lowered in some cases.

When the servo control light wavelength is 750 nm to 1,000 nm, the track pitch is preferably 1.7 μm to 30 μm, more preferably 1.9 μm to 20 μm, and particularly preferably 2.3 μm to 5 μm. When the track pitch is smaller than 1.7 μm, the tracking may be unstable because of scattered light in the middle of the recording layer. When the track pitch is larger than 30 μm, the recording density may be lowered in some cases.

When the servo control light wavelength is 350 nm to 500 nm, the track pitch is preferably 0.4 μm to 30 μm, more preferably 0.6 μm to 20 μm, particularly preferably 0.8 μm to 5 μm, and most preferably 1 μm to 2 μm. When the track pitch is smaller than 0.4 μm, the tracking may be unstable because of scattered light in the middle of the recording layer. When the track pitch is larger than 30 μm, the recording density may be lowered in some cases.

When the servo control light wavelength is around 405 nm, the track pitch is preferably 0.32 μm to 0.4 μm.

The groove depth of the servo pit pattern is not particularly limited and appropriately selected according to the purpose. For example, the groove depth is preferably $\lambda/(10n)$ to $\lambda/(3n)$, more preferably $\lambda/(8n)$ to $\lambda/(4n)$, and further preferably $\lambda/(7n)$ to $\lambda/(5n)$ in which $\lambda$ is the servo control light wavelength and "n" is the refractive index of the medium of the servo pit pattern or the refractive index of the material on the light entrance surface side of the pit.

When $\lambda$ is 650 nm and "n" is 1.6, the groove depth is preferably 41 nm to 135 nm. Generally, even if "n" is slightly changed, the groove depth is preferably 50 nm to 120 nm, more preferably 60 nm to 110 nm, and particularly preferably 80 nm to 100 nm when $\lambda$ is 650 nm. For other wavelengths, the groove depth is preferably proportional to the wavelength. For example, when the servo control light wavelength is 780 nm and "n" is 1.6, the groove depth is preferably 49 nm to 163 nm. When the servo control light wavelength is 405 nm and "n" is 1.6, the groove depth is preferably 25 nm to 84 nm.

The groove width of the servo pit pattern is not particularly limited and appropriately selected according to the purpose. For example, it is preferable that the groove width is larger than those of conventional CD, DVD, and BD/HD DVD. Specifically, when the servo control light wavelength is 650 nm, the groove width is preferably 0.25 μm to 1.05 μm, more preferably 0.35 μm to 0.95 μm, particularly preferably 0.45 μm to 0.85 μm, and most preferably 0.55 μm to 0.75 μm.

When the servo control light wavelength is 780 nm, the groove width is preferably 0.45 μm to 2 μm, more preferably 0.6 μm to 1.6 μm, particularly preferably 0.8 μm to 1.3 μm, and most preferably 1.0 μm to 1.1 μm.

When the servo control light wavelength is 405 nm, the groove width is preferably 0.2 μm to 1.0 μm, more preferably 0.25 μm to 0.8 μm, particularly preferably 0.3 μm to 0.6 μm, and most preferably 0.35 μm to 0.5 μm.

The angle of the servo pit pattern is not particularly limited and appropriately selected according to the purpose. For example, the angle is preferably 25° to 90°, more preferably 35° to 80°, particularly preferably 40° to 70°, and most preferably 45° to 60°. When the angle is 90°, the pattern has a rectangular shape.

<Fixing Step>

The fixing step is a step of fixing the record by irradiating the recording layer with fixing light after the recording is made in the recording layer, thereby stabilizing the recorded interference image.

The fixing step is performed by the fixing unit of the optical recording apparatus.

The fixing light irradiation method is not particularly limited and appropriately selected according to the purpose. For example, light from the same light source as the information beam and the reference beam or light from a light source different from theirs can be used.

—Fixing Light—

The fixing light irradiation region is not particularly limited and appropriately selected according to the purpose. For example, the fixing light irradiation region is preferably the same region as the recording region targeted by the information beam and the reference beam at any position of the recording layer or a region larger than the targeted recording region and extended by up to at least 1 μm outward from the outer periphery thereof. If the region extended beyond 1 μm outward from the targeted recording region is irradiated with the fixing light, the adjacent regions are also irradiated and excessive irradiation energy is inefficiently used.

The fixing light irradiation time is not particularly limited and appropriately selected according to the purpose. For example, the irradiation time is preferably 1 ns to 100 ms and more preferably 1 ns to 80 ms at any position of the recording layer. When the irradiation time is less than 1 ns, insufficient fixing may occur. When the irradiation time is more than 100 ms, excessive energy is irradiated. The fixing light irradiation is preferably preformed within 28 hours after the interference image is recorded. When the fixing light irradiation is performed more than 28 hours after the recording, the signal quality of the recorded information may be deteriorated.

The fixing light emission direction is not particularly limited and appropriately selected according to the purpose. For example, the fixing light is emitted to any position of the recording layer in the same direction as the information beam and the reference beam or in a direction different from them. The emission angle is preferably 0° to 60° and more preferably 0° to 40° in relation to the layer surface of the recording layer. When the emission angle is other than those angles, inefficient fixing may occur.

The fixing light wavelength is not particularly limited and appropriately selected according to the purpose. For example, the fixing light wavelength is preferably 350 nm to 850 nm and more preferably 400 nm to 600 nm at any position of the recording layer.

When the wavelength is smaller than 350 nm, the material may be decomposed. When the wavelength is larger than 850 nm, the material may be deteriorated because of elevated temperatures.

The fixing light source is appropriately selected according to the purpose. For example, the same light source as the information beam and the reference beam can be used, which is preferable because no additional light source is necessary. Light from the above described light source is used to irradiate the optical recording medium, whereby the same light source as the information beam and the reference beam can be used. Using the same light source facilitate the interference-image recorded region coinciding with the fixing light irradiation region, achieving efficient fixing light irradiation.

The fixing light irradiation rate is not particularly limited and appropriately selected according to the purpose. For example, the fixing light irradiation rate is preferably 0.001 mJ/cm$^2$ to 100 mJ/cm$^2$ and more preferably 0.01 mJ/cm$^2$ to 10 mJ/cm$^2$ at any position of the recording layer.

The fixing light irradiation method is not particularly limited and appropriately selected according to the purpose. For example, irradiation with light from the same light source as the information beam and the reference beam at any position of the recording layer is preferable. Irradiation with light from a different light source can be used in some cases.

(Optical Recording Medium)

In the optical recording medium of the present invention, information is recorded by the optical recording method of the present invention.

The optical recording medium of the present invention is an optical recording medium having at least a recording layer in which information is holographically recorded wherein interference images (interference fringes) are recorded as a holographic memory in the recording layer and fixed by the fixing light.

In the optical recording medium of the present invention, holographically recorded information can be a relatively thin plane hologram in which two-dimensional information is recorded or a volume hologram in which a large volume of information such as three-dimensional images is recorded, of a transmission type or a reflection type.

Furthermore, any hologram recording system can be used, including amplitude, phase, blazed, and complex amplitude holograms.

The optical recording medium is an optical recording medium having the above described recording layer, a first substrate, and a second substrate and, where necessary, other layers selected as appropriate.

<Recording Layer>

As the photosensitive material of the recording layer, a material in which information can be holographically recorded and having optical properties, such as absorption coefficient and refractive index, that can be changed according to the intensity of the electromagnetic waves when irradiated with electromagnetic waves of a specific wavelength is used.

The material of the recording layer is not particularly limited and appropriately selected according to the purpose. Examples of the material include (1) photopolymers that are polymerized through polymerization reaction upon light irradiation; (2) photorefractive materials exhibiting the photorefractive effect (the refractive index is changed due to space charge distribution upon light irradiation); (3) photochromic materials of which the refractive index is modulated through molecular isomerization upon light irradiation; (4) inorganic materials such as lithium niobate and barium titanate; and (5) chalcogen materials.

The photopolymers of the above (1) are not particularly limited and appropriately selected according to the purpose. For example, the photopolymer contains monomers and a photoinitiator and, where necessary, other components such as a sensitizer and oligomers.

Usable examples of the photopolymer include photopolymers described in "Photopolymer Handbook" (Kogyo Chosakai Publishing, 1989); "Photopolymer Technology" (Nikkan Kogyo Shimbun, 1989); SPIE Outlines Vol. 3010, pp 354-372 (1997) and SPIE Outlines Vol. 3291, pp 89-103 (1998). Usable examples of the photopolymer further include photopolymers described in Specifications of U.S. Pat. Nos. 5,759,721, 4,942,112, 4,959,284, and 6,221,536; Booklets of International Publication Nos. WO 97/44714, WO 97/13183, WO 99/26112, and WO 97/13183; Japanese Patent (JP-B) Nos. 2880342, 2873126, 2849021, 3057082, and 3161230; Japanese Patent Application Laid-Open (JP-A) Nos. 2001-316416 and 2000-275859.

Methods of changing optical properties of the photopolymer upon recording light irradiation include the use of diffusion of low-molecular weight components. Components that diffuse in the opposite direction to polymerization components can be added for reducing the volume change during the polymerization. Alternatively, compounds having an acid cleavage structure can additionally be used besides the polymers. When photopolymers containing the low-molecular weight components are used to form a recording layer, a structure that allows the recording layer to hold a liquid may be necessary in some cases. When compounds having an acid cleavage structure are additionally used, the volume change can be reduced by compensating the expansion resulting from the cleavage with the contraction resulting from polymerization of monomers.

The above described monomers are not particularly limited and appropriately selected according to the purpose. Examples of the monomers include radical polymerization type monomers having unsaturated bonds such as acrylic and methacrylic groups, and cationic polymerization type monomers having ether structures such as epoxy and oxetane rings. These monomers can be monofunctional or polyfunctional. Furthermore, they can be of a photocrosslinking reaction type.

Examples of the radical polymerization type monomers include acryloyl morpholine, phenoxyethyl acrylate, isobornyl acrylate, 2-hydroxypropyl acrylate, 2-ethylhexyl acrylate, 1,6-hexanediol diacrylate, tripropyleneglycol diacrylate, neopentyl glycol PO modified diacrylate, 1,9-nonandiol diacrylate, hydroxypivalic acid neopentyl glycol diacrylate, EO modified bisphenol A diacrylate, polyethylene glycol diacrylate, pentaerythritol toriacrylate, pentaerythritol tetraacrylate, pentaerythritol hexaacrylate, EO modified glycerol toriacrylate, trimethylolpropane triacrylate, EO modified trimethylolpropane triacrylate, 2-napht-1-oxyethyl acrylate, 2-carbazoyl-9-ylethyl acrylate, (trimethylsilyloxy) dimethylsilylpropyl acrylate, vinyl-1-naphtoate, and N-vinylcarbazole.

Examples of the cationic polymerization type monomers include bisphenol A epoxy resins, phenol novolac resin, glycerol triglycidyl ether, 1,6-hexane glycidyl ether, vinyl trimethoxy silane, 4-vinylphenyl trimethoxy silane, γ-metacryloxypropyl triethoxy silane, and compounds having the structural formulae (A) to (E).

These monomers can be used individually or in a combination of two or more.

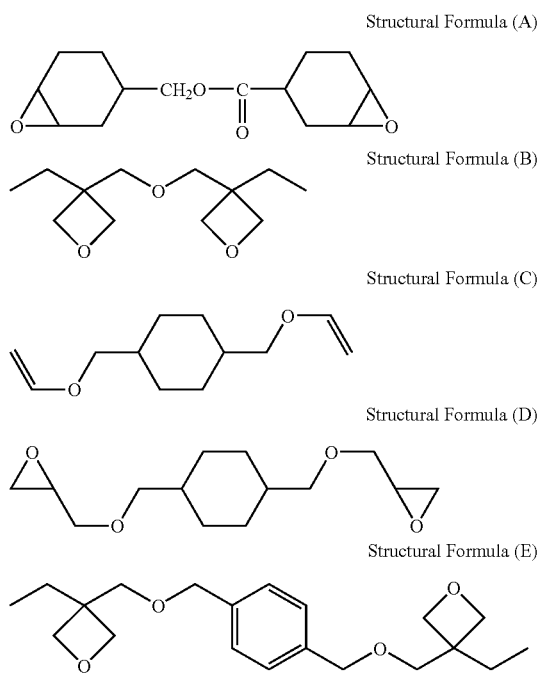

Structural Formula (A)

Structural Formula (B)

Structural Formula (C)

Structural Formula (D)

Structural Formula (E)

The photoinitiator is not particularly limited as long as it is sensitive to the recording light and can be a material initiating radical polymerization, cationic polymerization, or crosslinking reaction upon light irradiation.

Examples of the photoinitiator include 2,2'-bis(o-chlorophenyl)-4,4',5,5'-tetraphenyl-1,1'-biimidazol, 2,4,6-tris (trichloromethyl)-1,3,5-triazine, 2,4-bis(trichloromethyl)-6-(p-methoxyphenylvinyl)-1,3,5-toriazine, diphenyliodonium tetrafluoroborate, diphenyliodonium hexafluorophosphate, 4,4'-di-t-butyldiphenyliodonium tetrafluoroborate, 4-diethylaminophenylbenzenediazonium hexafluorophosphate, benzoin, 2-hydroxy-2-methyl-1-phenylpropane-2-on, benzophenone, thioxanthone, 2,4,6-trimethylbenzoyldiphenylacylphosphineoxide, triphenylbutyborate tetraethyl ammonium, bis(5-2,4-cyclopentadien-1-yl), bis[2,6-difluoro-3-(1H-pyrrol-1-yl)phenyltitanium], diphenyl-4-phenylthiophenylsulfonium hexafluorophosphate, and titanocene compounds having the structural formula below. These materials can be used individually or in a combination of two or more. Sensitizing dyes can additionally be used in accordance with the emitted light wavelength.

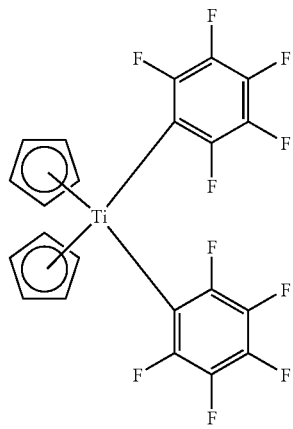

The photopolymer can be obtained by stirring and mixing the above described monomers, photoinitiator, and, where necessary, other components to allow them to react. When the obtained photopolymer has a sufficiently low viscosity, it can be cast to form a recording layer. In the meanwhile, when the photopolymer has a viscosity too high to cast, the photopolymer is placed on a second substrate in a heap using a dispenser and, then, a first substrate is pressed against the photopolymer from above to spread it over the entire surface, thereby forming a recording layer.

The photorefractive materials of the above (2) are not particularly limited as long as they exhibit the photorefractive effect and appropriately selected according to the purpose. For example, the photorefractive material contains a charge generating material and a charge transporting material and, where necessary, other components.

The charge generating material is not particularly limited and appropriately selected according to the purpose. Examples of the charge generating material include phthalocyanine dyes/pigments such as metal phthalocyanine, non-metal phthalocyanine, or their derivatives; naphthalocyanine dyes/pigments; azo dyes/pigments such as monoazo, diazo, and trisazo; perylene dyes/pigments; indigo dyes/pigments; quinacridone dyes/pigments; polycyclic quinine dyes/pigments such as anthraquinone and anthanthrone; cyanine dyes/pigments; charge-transfer complexes consisting of an electron acceptor and an electron donor represented by TTF-TCNQ; azurenium salts; and fullerene represented by $C_{60}$ and $C_{70}$ and their derivatives, methanofullerene. These materials can be used individually or in a combination of two or more.

The charge transporting material is a material that transports holes or electrons. It can be a low molecular weight compound or high molecular weight compound.

The charge transporting material is not particularly limited and appropriately selected according to the purpose. Examples of the charge transporting material include nitrogen-containing cyclic compounds such as indole, carbazole, oxazole, inoxazole, thiazole, imidazole, pyrazole, oxadiazole, pyrazoline, thiathiazole, and triazole, or their derivatives; hydrazone compounds; triphenylamines; triphenylmethanes; butadienes; stilbenes; quinone compounds such as anthraquinone diphenoxyquinone; fullerene such as $C_{60}$ and $C_{70}$ and their derivatives; π-conjugated polymers or oligomers such as polyacetylene, polypyrrole, polythiophene, and polyaniline; σ-conjugated polymers or oligomers such as polysilane and polygermane; and polycyclic aromatic compounds such as anthracene, pyrene, phenanthrene, and coronene. These compounds can be used individually or in a combination of two or more.

For forming a recording layer using the photorefractive material, for example, a coating solution of the photorefractive material dissolved or dispersed in a solvent is used to form a coating and the solvent is removed from the coating to form a recording layer. Alternatively, the photorefractive material heated and fluidized is used to form a coating and the coating is quenched to form a recording layer.

The photochromic materials of the above (3) are not particularly limited as long as they initiate a photochromic reaction and appropriately selected according to the purpose. Examples of the photochromic materials include azobenzene compounds, stilbene compounds, indigo compounds, thioindigo compounds, spiropyran compounds, spirooxazine compounds, fulgide compounds, anthracene compounds, hydrazone compounds, and cinnamic acid compounds. Among them, azobenzene derivatives and stilbene derivatives that are subject to structural changes due to cis-trans isomerization upon light irradiation, and spiropyran derivatives and spirooxazine derivatives that are subject to structural changes due to ring-opening—ring closing upon light irradiation are particularly preferable.

Examples of the chalcogen materials of the above (5) include materials containing chalcogenide glass containing a chalcogen element and metal particles dispersed in the chalcogenide glass and diffusible in the chalcogenide glass upon light irradiation.

The chalcogenide glass consists of a non-oxide amorphous material containing a chalcogen element such as S, Te, and Se. The chalcogenide glass is not particularly limited as long as it can be photodoped with metal particles.

Examples of the calcogen element-containing amorphous material include Ge—S glass, As—S glass, As—Se glass, and As—Se—Ce glass. Among them, Ge—S glass is preferable. When Ge—S glass is used as the chalcogenide glass, the composition ratio of Ge to S constituting the glass can be changed on an arbitrary basis according to the irradiation light wavelength. However, a chalcogenide glass mainly having a chemical composition of $GeS_2$ is preferable.

The metal particles are not particularly limited as long as the chalcogenide glass can be photodoped with them upon light irradiation and appropriately selected according to the purpose. Examples of the metal particles include Al, Au, Cu, Cr, Ni, Pt, Sn, In, Pd, Ti, Fe, Ta, W, Zn, and Ag. Among them, Ag, Au, and Cu facilitate the photodoping and Ag is particularly preferable because it leads to notable photodoping.

The content of the metal particles dispersed in the chalcogenide glass is preferably 0.1% by volume to 2% by volume and more preferably 0.1% by volume to 1.0% by volume based on the total volume. When the content of the metal particles is lower than 0.1% by volume, the change in transmittance due to photodoping may not be sufficient, causing the recording accuracy to drop. When the content is higher than 2% by volume, the light transmittance of the recording material may be reduced, hampering sufficient photodoping.

The recording layer can be formed by a known technique according to the material. It can preferably be formed, for example, by vapor deposition, wet coating, MBE (molecular beam epitaxy), cluster ion beaming, molecular stacking, LB, printing, or transfer. Among them, vapor deposition and wet coating are preferable.

The vapor deposition is not particularly limited and appropriately selected among known techniques according to the purpose. Examples of the vapor deposition include vacuum vapor deposition, resistance heating deposition, chemical vapor deposition, and physical vapor deposition. The chemical vapor deposition includes plasma CVD, laser CVD, heat CVD, and gaseous CVD.

For forming a recording layer by a wet coating method, for example, a solution (coating solution) of the recording layer material dissolved or dispersed in a solvent is preferably used (applied and dried). The wet coating method is not particularly limited and appropriately selected among known techniques according to the purpose. Examples of the wet coating method include ink jet, spin coating, kneader coating, bar coating, blade coating, casing, dipping, and curtain coating.

The thickness of the recording layer is not particularly limited and appropriately selected according to the purpose. The thickness is preferably 1 μm to 1,000 μm and more preferably 100 μm to 700 μm.

Satisfactory S/N ratios can be obtained in 10-fold to 300-fold shift-multiple recording when the thickness of the coating layer is within the above preferable numerical range and this outcome is advantageously more notable when the thickness of the coating layer is within the above more preferable numerical range.

<First Substrate>

The first substrate is not particularly limited in shape, structure, size, and the like and appropriately selected according to the purpose. For example, the first substrate can be in the shape of a disc or a card, which should be made of a material ensuring the mechanical strength of the optical recording medium. When light used for recording and reproduction enters via the substrate, the substrate has to be sufficiently transparent to the operating light wavelength range.

The first substrate can generally be made of glass, ceramic, or resin. Resin is particularly preferable in terms of moldability and cost. Glass is also preferable in terms of accuracy.

Examples of the resin include polycarbonate resin, acrylic resin, epoxy resin, polystyrene resin, acrylonitrile-styrene copolymers, polyethylene resin, polypropylene resin, silicone resin, fluorine resin, ABS resin, urethane resin, and amorphous polyolefin resin. Among them, polycarbonate resin, acrylic resin, and amorphous polyolefin resin are particularly preferable in terms of moldability, optical properties, and cost.

The first substrate can be those appropriately synthesized or commercially available.

The thickness of the first substrate is not particularly limited and appropriately selected according to the purpose. The thickness is preferably 0.1 mm to 5 mm and more preferable 0.3 mm to 2 mm. When the substrate has a thickness of smaller than 0.1 mm, the disc may not be able to resist distortion while stored. When the substrate has a thickness of larger than 5 mm, the entire disc weight is increased and an excessive load may be imposed on the drive motor.

The light transmittance of the first substrate is preferably 70% to 99.9%, more preferably 80% to 99%, and particularly preferably 90% to 98% to 405 nm at an incident angle of ±30°.

When the light transmittance is lower than 70%, the signal reading accuracy may be lowered. When the light transmittance is higher than 99.9%, the productivity may be reduced.

The first substrate is preferably provided with an antireflection layer for increased signal intensity. The reflectance of the antireflection layer is preferably 0.001% to 2%, more preferably 0.01% to 1%, and particularly preferably 0.1% to 0.5% for incident light at a right angle.

<Second Substrate>

The second substrate can be the same as or different from the first substrate in shape, structure, size, material, and thickness. Among these, it is preferable that the second substrate is the same as the first substrate in shape and size.

The second substrate can have a reflection film on the side in contact with the recording layer.

—Reflection Film—

The reflection film is formed in the manner that the emitted information beam and reference beam or reproduction beam, which is described layer, focuses on the surface of the reflection film and the information beam and the reference beam or reproduction beam is reflected by the surface of the reflection film.

The material of the reflection film is not particularly limited and appropriately selected according to the purpose. For example, materials having a high reflectance to the recording light and reference beam are preferable. When the operating light wavelength is 400 nm to 780 nm, for example, Al, Al alloy, Ag, and Ag alloy are preferably used. When the operating light wavelength is 650 nm or larger, Al, Al alloy, Ag, Ag alloy, Au, Cu alloy, and TiN are preferably used.

The formation method of the reflection film is not particularly limited and appropriately selected according to the purpose. Examples of the formation method include vacuum vapor deposition, sputtering, plasma CVD, optical CVD, ion plating, and electron beam vapor deposition. Among them, sputtering is an excellent method in terms of mass productivity and coating quality.

The thickness of the reflection film is preferably 50 nm or larger and more preferably 100 nm or larger so that a sufficient reflectance can be achieved.

—Servo Pattern Pit—

It is preferable that the servo pit pattern for tracking, sliding, and focusing servo controls as described with regard to the optical recording method is provided to the second substrate.

The size and other details of the servo pit pattern are as described above with regard to the optical recording method of the present invention.

<Other Layers>

The other the layers are not particularly limited and appropriately selected according to the purpose. For example, a gap layer can be provided.

—Gap Layer—

A gap layer is provided between the recording layer and the reflection film where necessary for smoothing the surface of the second substrate. It is also useful to adjust the size of hologram generated in the recording layer. In other words, the recording layer has to have a region of a certain size for interference between the reference beam and the information beam for recording; therefore, it is useful to provide a gap between the recording layer and the servo pit pattern.

The gap layer can be formed, for example, by applying a material such as an ultraviolet curable resin on the servo pit pattern, for example, using spin coating and curing the material. The thickness of the gap layer is not particularly limited and appropriately selected according to the purpose. The thickness is preferably 1 μm to 200 μm.

Hereinafter, a specific example of embodiment of the optical recording medium of the present invention will be described in detail with reference to the drawing.

Specific Example of Embodiment

Figure 2:
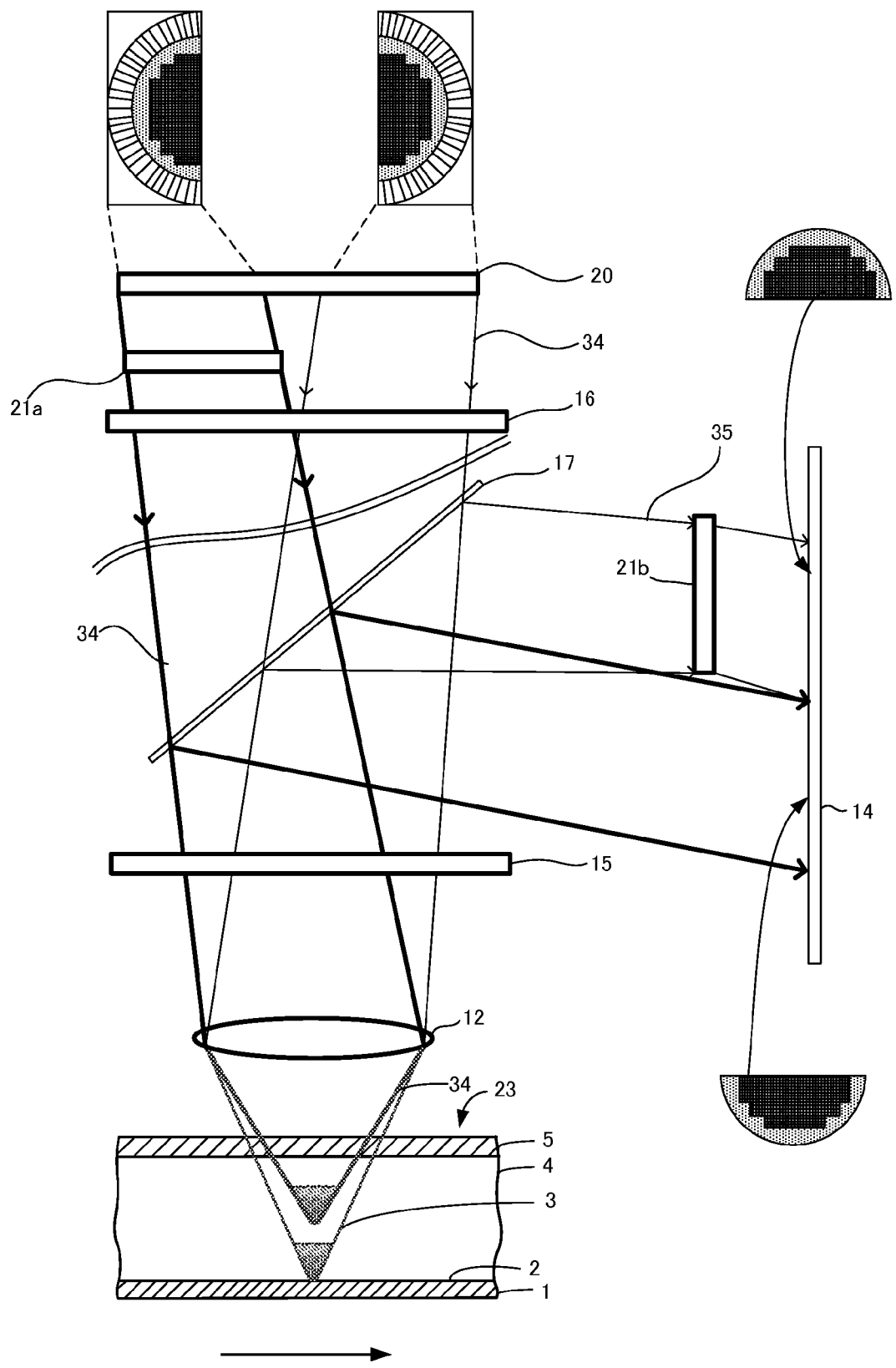
FIG. 2 is an explanatory illustration showing an embodiment of the optical system used in the optical recording method and optical reproducing method of the present invention.

FIG. 2 is a schematic cross-sectional view showing the structure of an optical recording medium 23 of a specific example of embodiment of the present invention. The optical recording medium 23 has a polycarbonate resin or glass substrate 1, on the surface of which an aluminum, gold, or platinum reflection film 2 is provided. Here, a servo pit pattern can also be provided on the surface of the substrate 1. In FIG. 2, the arrow indicates the circumferential direction of the optical recording medium 23.

When the above described gap layer is formed in this specific example of embodiment, the gap layer can be formed by applying a material such as an ultraviolet curable resin on the reflection film 2 of the second substrate 1, for example, by spin coating. The gap layer protects the reflection film 2 and is useful to adjust the size of hologram generated in the recording layer 4. In other words, the recording layer 4 has to have a region of a certain size for interference between the reference beam and the information beam for recording; therefore, it is useful to provide a gap between the recording layer 4 and the reflection film.

A recording layer is deposited on the gap layer. The recording layer 4 is interposed between a first substrate 5 (polycarbonate resin or glass substrate) and the second substrate 1 to form an optical recording medium 23.

In the optical recording medium 23 of this specific example of embodiment, the second substrate 1 has a thickness of 0.6 mm; the recording layer 4 has a thickness of 0.6 mm; and the first substrate 5 has a thickness of 0.6 mm; therefore, the total thickness is approximately 1.8 mm. When a gap layer is formed on the reflection film 2, the gap layer preferably has a thickness of 100 μm.

(Optical Reproducing Method and Optical Reproducing Apparatus)

The optical reproducing method of the present invention includes at least an optical reproducing step, preferably includes an optical path length adjusting step, and, where necessary, includes other steps such as a servo control step.

The optical reproducing apparatus of the present invention includes at least an optical reproducing unit and an optical path length adjusting unit and, where necessary, includes other units such as a servo control unit.

It is preferable that the optical reproducing method of the present invention is used in reproducing information recorded in the optical recording medium by a co-called colinear optical recording method in which the information beam and the reference beam are emitted with their optical axes being coaxially aligned. The following explanation is made mainly for the colinear system. However, the optical reproducing method of the present invention is not limited to the colinear system and applicable to optical recording media optically recorded by other systems such as the two-beam interference system.

The optical reproducing method of the present invention can be realized by the optical reproducing apparatus of the present invention. The optical reproducing apparatus will also be clarified through the explanation of the steps of the optical reproducing method.

[Optical Reproducing Step]

The optical reproducing step is a step to irradiate interference images formed in the recording layer by the optical recording method of the present invention with a reproduction beam that is the same as the reference beam used during the recording, receive at a light receiving unit diffracted light generated upon the irradiation, and reproduce the recorded information based on the interference images.

The reproduction beam can be the same as the reference beam used during the recording. It is preferable that the reproduction beam is emitted in the same direction as the reference beam to reproduce the recorded information.

When multiple interference fringes formed through the thickness of the recording layer of the optical recording medium are irradiated with the reproduction beam, diffracted lights having an intensity distribution corresponding to the optical property distribution formed in the recording layer are generated as the recorded information corresponding to the interference images. The diffracted lights can be received by a light receiving unit of a CCD, C-MOS, PD array or the like for reproduction. A piece of recording information is recorded in parts by the optical recording method of the present invention, and thus the recording density at each interference fringe is low and diffraction noise due to diffracted lights from the adjacent interference fringes is reduced, whereby highly accurate and excellent reproduction is realized.

When the optical path lengths of the information beam and the reference beam are adjusted to be different from each other using the optical lath length adjusting units as shown in FIGS. 3B, 3C, 4B, and 4C during recording, diffracted lights can be generated from the interference images using a reproduction beam that is the same as the reference beam without particular optical adjustments during the reproduction. The diffracted lights are received by a light receiving unit and used for reproduction as they are.

[Optical Path Length Adjusting Step]

The optical path adjusting step includes at least one of the following: (1) dividing the reproduction beam into two or more between the light source of the reproduction beam and the optical recording medium and adjusting the optical path lengths of the divided reproduction beams so that they focus on points different from each other through the thickness of the recording layer; and (2) adjusting the optical path lengths of diffracted lights having different optical path lengths between the optical recording medium and the light receiving unit so that they focus on the same plane of the light receiving unit.

The optical path length adjusting step is performed by the optical path length adjusting unit of the optical reproducing apparatus.

One or both of (1) the adjustment of the optical path length between the light source of the reproduction beam and the optical recording medium and (2) the adjustment of the optical path length between the optical recording medium and the light receiving unit can be performed. For example, it is preferable that both of the above (1) and (b) are performed when the reference beam is also divided into two or more for the optical path length adjustment in the optical recording method of the present invention.

In any case, it is preferable that the optical path length adjustment is performed by at least one provided optical path length adjusting unit.

It is preferable that the optical path length adjusting unit has on its light emitting surface points that are at different distances from the optical recording medium. Alternatively, two or more optical path length adjusting units are provided at different positions in the light emission direction so that there are points at different distances from the optical recording medium.

The optical path length adjusting unit may include a focal point adjusting member or a spatial light modulator, or both of them. The optical path length adjusting unit may include other appropriately selected members as long as the optical path length can be adjusted.

The focal point adjusting member and spatial light modulator can be the same ones as those described with regard to the optical recording method of the present invention.

(1) Adjustment of the Optical Path Length Between the Light Source of the Reproduction Beam and the Optical Recording Medium With the optical path length between the light source of the reproduction beam and the optical recording medium being adjusted, the interference fringes recorded at different positions through the thickness of the recording layer by the optical recording method of the present invention are each irradiated with the reproduction beam. Diffracted lights are generated from the interference fringes and the diffracted lights are received by a light receiving unit to reproduce the information corresponding to the interference fringes.

(2) Adjustment of the Optical Path Length Between the Optical Recording Medium and the Light Receiving Unit Diffracted lights generated from the interference fringes recorded at different positions through the thickness of the recording layer are diffracted with the optical path lengths adjusted during the optical recording. Therefore, they may have different focal lengths when received by a light receiving unit. With the optical path lengths of the diffracted lights between the optical recording medium and the light receiving unit being adjusted in the same manner as the optical adjustment during the recording, the diffracted lights having different optical path lengths focus on the same plane of the light receiving unit. Consequently, highly precise reproduction, not shifted or out-of-focus, is available.

The optical path length between the optical recording medium and the light receiving unit can be adjusted by the same method and unit as the optical path length between the light source of the reproduction beam and the optical recording medium of the above (1) (for example, when the optical path lengths between the light source of the reproduction beam and the optical recording medium are adjusted by two spatial light modulators, the optical path lengths between the optical recording medium and the light receiving unit are also adjusted by the same two spatial light modulators) or by a different method and unit (for example, the optical path lengths between the light source of the reproduction beam and the optical recording medium are adjusted by two spatial light modulators and the optical path lengths between the optical recording medium and the light receiving unit are adjusted by focal point adjusting members) as long as the optical path lengths are adjusted so that the diffracted lights having different optical path lengths focus on the same plane of the light receiving unit.

The adjustment rate of the optical path length between the light source of the reproduction beam and the optical recording medium is preferably 1 μm to 1,000 μm, more preferably 10 μm to 500 μm, and further preferably 50 μm to 300 μm.

More specifically, in the optical path length adjusting unit provided between the light source of the reproduction beam and the optical recording medium and having on the light merging surface points that are at different distances from the optical recording medium, the difference "l" in distance between the light emitting surface and the optical recording medium is preferably 1 μm to 1,000 μm, more preferably 10 μm to 500 μm, and further preferably 50 μm to 300 μm.

When two or more optical path length adjusting units are provided between the light source of the reproduction beam and the optical recording medium, the distance "l" in the light emission direction between the optical path length adjusting units is preferably 1 μm to 1,000 μm, more preferably 10 μm to 500 μm, and further preferably 50 μm to 300 μm.

When the focal length adjusting member is used, the optical path length adjustment rate L can be calculated as follow:

$$L = (n-i) \times t$$

in which "n" is the refractive index of the focal length adjusting member, "i" is the refractive index of the air, which is one or 1, and "t" is the thickness of the focal length adjusting member.

The above L is preferably 1 μm to 1,000 μm, more preferably 10 μm to 500 μm, and further preferably 50 μm to 300 μm.

The distance "d" in the direction intersecting with the light emission direction between two or more optical path length adjusting units provided at different positions between the light source of the reproduction beam and the optical recording medium and the total width D across all optical path length adjusting units preferably satisfy d/D=1/1,000 to 1/2, more preferably 1/500 to 1/5, further preferably 1/100 to 1/10.

In the meanwhile, the light receiving unit optionally enlarges/reduces the reproduced image in size in some cases. To this end, in the optical path length adjusting unit provided between the optical recording medium and the light receiving unit and having on the light emitting surface points that are at different distances from the optical recording medium, the difference l' in distance between the light emitting surface and the optical recording medium is preferably x μm to 1,000× μm (in which x is the scale of enlargement or reduction of the reproduced image at the light receiving unit), more preferably 10× μm to 500× μm, and further preferably 50× μm to 300× μm.

When two or more optical path length adjusting units are provided between the optical recording medium and the light receiving unit, it is preferable that the distance l' in the light emission direction between the two or more optical path length adjusting units satisfies the above numerical range.

Preferably, l'=xl when the optical path length is adjusted both on the light source side and on the light receiving unit side.

When the focal length adjusting member is used, the optical path length adjustment rate L' can be calculated as follow:

$$L'=(n-i) \times t$$

in which "n" is the refractive index of the focal length adjusting member, "i" is the refractive index of the air, which is one or 1, and "t" is the thickness of the focal length adjusting member.

The above L' is preferably x to 1,000× μm (in which x is the scale of enlargement or reduction of the reproduced image at the light receiving unit), more preferably 10× μm to 500× μm, and further preferably 50× μm to 300× μm.

Preferably, L'=xL when the optical path length is adjusted both on the light source side and on the light receiving unit side. Preferably, L'=xl when the optical path length is adjusted on the light source side by something other than the focal length adjusting member.

With the above adjustments, two or more divided images focus on the same plane with the same scale of enlargement or reduction, whereby a fine reproduction of the image, not out-of-focus, shifted, or distorted, is obtained.

The distance "d'" in the direction interesting with the light emission direction between two or more optical path length adjusting units provided at different positions between the optical recording medium and the light receiving unit and the width D' of the light receiving unit preferably satisfy d'/D'=1/1,000 to 1/2, more preferably 1/500 to 1/5, and further preferably =1/100 to 1/10.

When the above l, l', d' and others in the optical reproducing method of the present invention do not satisfy the above preferable numerical ranges, the problems as described with regard to the optical recording method of the present invention are observed.

(Optical Recording/Reproducing Apparatus)

The optical recording method and optical reproducing method of the present invention are realized using the optical recording/reproducing apparatus of the present invention described hereafter.

The optical recording/reproducing apparatus used with the optical recording method and optical reproducing method of the present invention is described with reference to FIG. 7.

Figure 7:
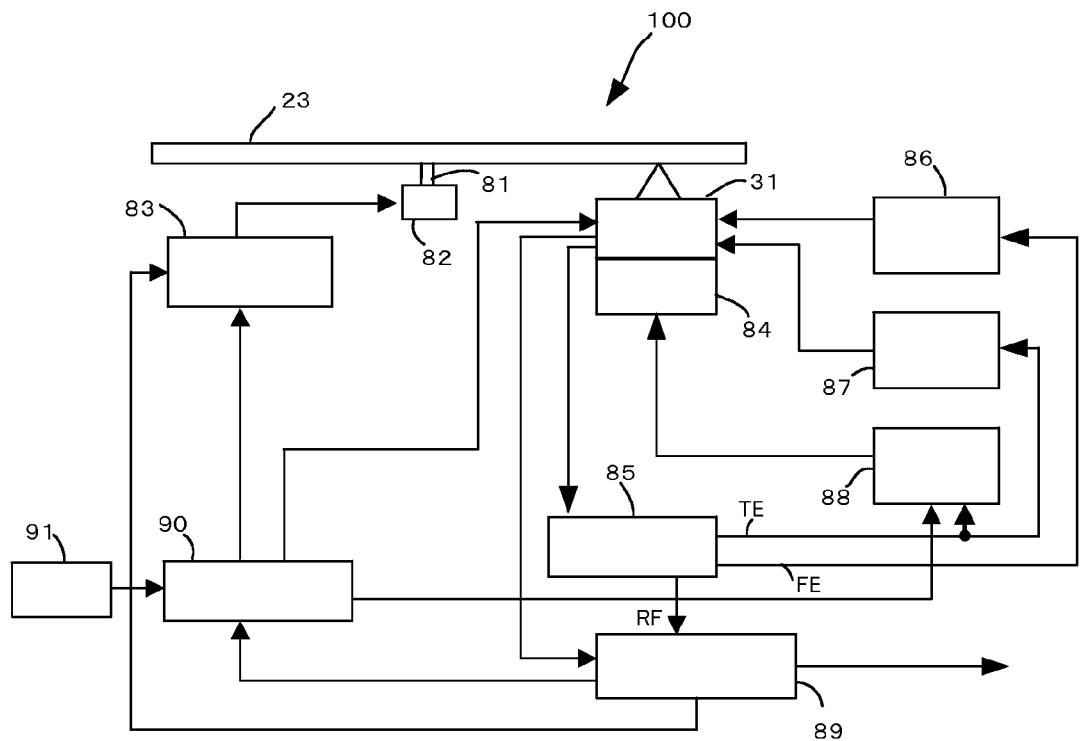
FIG. 7 is a block diagram showing an embodiment of the entire configuration of the optical recording/reproducing apparatus of the present invention.

FIG. 7 is an illustration showing the entire structure of the optical recording/reproducing apparatus according to an embodiment of the present invention. The optical recording/reproducing apparatus includes an optical recording apparatus and an optical reproducing apparatus.

An optical recording/reproducing apparatus 100 is provided with a spindle 81 for mounting an optical recording medium 23, a spindle motor 82 for rotating the spindle 81, and a spindle servo circuit 83 for controlling the spindle motor 82 to maintain the rotation speed of the optical recording medium at a specific value.

The optical recording/reproducing apparatus 100 is further provided with a pick-up 31 that emits information beam and recording reference beam to the optical recording medium during recording and emits reproduction beam to the optical recording medium and detects diffracted light during the information reproduction and a drive unit 84 that moves the pick-up 31 in a radial direction of the optical recording medium 23.

The optical recording/reproducing apparatus 100 is further provided with a unit for dividing at least one of the information beam and the reference beam into two or more and adjusting the optical lath lengths of the divided information beams and reference beams so that they focus on points different from each other through the thickness of the recording layer, a unit for dividing the reproduction beam into two or more and adjusting the optical path lengths of the divided reproduction beams so that they focus on points different from each other through the thickness of the recording layer, and a unit for adjusting the optical lengths of diffracted lights generated from interference fringes upon the irradiation with the reproduction beam and having different optical path lengths so that they focus on the same plane of the light receiving unit.

The optical recording/reproducing apparatus 100 is provided with a detection circuit 85 for detecting focusing error signal FE, tracking error signal TE, and reproduction error signal RF among output signals from the pick-up 31, a focusing servo circuit 86 for driving an actuator within the pick-up 31 based on the focusing error signal FE detected by the detection circuit 85 to move an objective lens (not shown) in the thickness direction of the optical recording medium 23 for focusing servo control, a tracking servo circuit 87 for driving an actuator within the pick-up 31 based on the tracking error signal TE detected by the detection circuit 85 to move the objective lens in a radial direction of the optical recording medium for tracking servo control, and a sliding servo circuit 88 for controlling the drive unit 84 based on the tracking error signal TE and instructions from a controller, which is described later, to move the pick-up 31 in a radial direction of the optical recording medium 23 for sliding servo control.

The optical recording/reproducing apparatus 100 is further provided with a signal processing circuit 89 for decoding output data from a CMOS or CCD array, which is described later, within the pick-up 31, reproducing information recorded in the recording layer of the optical recording medium, and reproducing the basic clock and identifying addresses from the reproduction signal RF from the detection circuit 85, a controller 90 for controlling the entire optical recording/reproducing apparatus 100, and an operation part 91 for giving various instructions to the controller 90.

The controller 90 receives the basic clock and address information output from the signal processing circuit 89 and controls the pick-up 31, spindle servo circuit 83, sliding servo circuit 88, and the like. The spindle servo circuit 83 receives the basic clock output from the signal processing circuit 89. The controller 90 has a CPU (central processing unit), a ROM (read only memory), and a RAM (random access memory). The CPU executes programs stored in the ROM using the RAM as a working space to realize the functions of the controller 90.

Embodiment 1 of Optical Recording and Reproduction

Embodiment 1 of the optical recording method of the present invention and optical reproducing method of the present invention using the optical path length adjusting unit is described hereafter with reference to the drawing.

In Embodiment 1, as shown in FIG. 1, two spatial light modulators 20a and 20b are provided between a light source (not shown) of the information beam and the reference beam and reproduction beam and the optical recording medium 23 with a distance "l" in the light emission direction. The two spatial light modulators 20a and 20b create a difference in optical path length l. The two spatial light modulators 20a and 20b are apart by a distance "d" in the direction intersecting the light emission direction. The details of the distances "l" and d are as described above.

A focal length adjusting plate 21 for adjusting the optical path length of diffracted light generated from the reproduction beam coming from the spatial light modulator 20a is provided between the optical recording medium 23 and the light receiving unit 14. Here, the optical path length adjustment rate L' of the focal length adjusting plate 21 satisfies l'=xl (in which x is the scale of enlargement or reduction at the light receiving unit). The adjustment rate L' can be calculated as follows: L'=(n−i)×t (in which "n" is the refractive index of the focal length adjusting member, "i" is the refractive index of the air, which is one or 1, and "t" is the thickness of the focal length adjusting member).

<Optical Recording>

The optical recording and optical behavior on the optical recording medium 23 in this embodiment is described. As shown in FIG. 1, a laser beam is emitted from a light source to the spatial light modulators 20a and 20b. The spatial light modulators 20a and 20b divide information to be recorded into two and generate and emit information beams and reference beams 34 having different optical path lengths to the optical recording medium 23. The two divided information beams and reference beams 34 having different optical path lengths are linearly polarized via a polarizing element 16 and circularly-polarized via a half mirror 17 and a quarter wavelength plate 15 before they enter the optical recording medium. The two divided information beams and reference beams 34 focus on points different from each other through the thickness of the optical recording medium 23. Interference fringes are created as a result of interference between the information beam and the reference beam 34, whereby information is recorded.

Following the recording, the optical recording medium 23 or the information beam and the reference beam 34 are horizontally shifted by a specific pitch. At this position, the information beam and the reference beam are emitted and their optical path lengths are adjusted by the spatial light modulators 20a and 20b before they enter the recording layer 4. Then, information is recorded in the recording layer 4 in parts in the same manner as the previous one.

In this way, the optical density is distributed among multiple positions for recording one piece of information. Therefore, the recording material in the area where the optical density is high, or near the vertex of an inverted cone-shaped interference fringe 3, is not exclusively exhausted. Uneven consumption of the material between the upper and lower parts through the thickness of the recording layer 4 is reduced. The subsequent recording information can be overwritten at a smaller pitch, thereby increasing the recording density and allowing high multiple recording.

—Fixing of the Recording—

The recorded region is irradiated with the fixing light at least within 28 hours after the interference images 3 are recorded in the recording layer 4 to fix the recorded interference images 3.

<Optical Reproduction>

In order to reproduce the recorded information, the optical recording medium 23 is irradiated with a laser beam. Then, as shown in FIG. 1, the laser beam is modulated by the spatial light modulators 20a and 20b to generate two reproduction beams 34 having different optical path lengths. The two reproduction beams 34 are linearly-polarized via the polarizing element 16, circularly-polarized via the half mirror 17 and quarter wavelength plate 15, and collected by the objective lens 12 before they enter the optical recording medium 23. Then, they focus on the interference images 3 recorded at different positions through the thickness of the recording layer 4. Upon this irradiation, diffracted lights 35 are each generated from the interference images 3. Reflected by the reflection film 2, the diffracted lights 35 exit from the optical recording medium 23, pass through the objective lens 12, and are reflected by the half mirror 17. The diffracted light 35 generated from the reproduction beam 34 coming from the spatial light modulator 20b is received by the light receiving unit 14 as it is. In the meanwhile, the diffracted light 35 generated from the reproduction beam 34 coming from the spatial light modulator 20a is received by the light receiving unit 14 after the optical path length is adjusted by the focal length adjusting plate 21 on the light receiving unit 14 side so that it focus on the plane of the light receiving unit 14. The light receiving unit 14 reproduces information corresponding to the interference images 3 in an equal, enlarged, or reduced size.

With the optical path length being adjusted by the focal length adjusting plate 21 on the light receiving unit 14 side, a fine reproduction of the recorded information, not out-of-focus, shifted, or distorted, can be obtained.

Embodiment 2 of the Optical Recording and Reproduction

Embodiment 2 of the optical recording method of the present invention and optical reproducing method of the present invention using the optical path length adjusting unit is described hereafter with reference to the drawing.

In Embodiment 2, as shown in FIG. 2, a focal point adjusting member 21a is provided between a spatial light modulator 20 that modulates a laser beam emitted from a light source and generates information beam and reference beam and the optical recording medium 23. Having a width smaller than the spatial light modulator 20, the focal point adjusting member 21a adjusts the optical path lengths of a half of the information beam and the reference beam from the spatial light modulator 20. The optical path length adjustment rate is calculated as follows: L=(n−i)×t (in which "n" is the refractive index of the focal length adjusting member, "i" is the refractive index of the air, which is one or 1, and "t" is the thickness of the focal length adjusting member).

A focal point adjusting member 21b similar to the focal point adjusting member 21a is provided between the optical recording medium 23 and the light receiving unit 14 to adjust the optical path lengths of the diffracted lights 35. The optical path length adjustment rate by the focal point adjusting member 21b is calculated as follows: L'=(n−i)×t (in which "n" is the refractive index of the focal length adjusting member, "i" is the refractive index of the air, which is one or 1, and "t" is the thickness of the focal length adjusting member). Preferably, L'=xL (in which x is the scale of enlargement or reduction at the light receiving unit).

<Optical Recording>

The optical recording and optical behavior on the optical recording medium 23 in Embodiment 2 is described. The optical behavior of the polarizing element 16, half mirror 17, quarter wavelength plate 15 is the same as in Embodiment 1 and is not described here. First, as shown in FIG. 2, a laser beam is emitted from a light source to the spatial light modulator 20. The spatial light modulator 20 generates information beam and reference beam and the optical recording medium 23 is irradiated with the information beam and the reference beam 34. A half of the information beam and the reference beam 34 passes through the focal length adjusting member 21a provided on the optical path of the information beam and the reference beam 34 so that they have different optical path lengths from the other half of the information beam and the reference beam 34 that do not pass through the same. The two information beams and reference beams 34 having different optical path lengths are collected by the collective lens 12 before they enter the optical recording medium 23. The information beams and reference beams 34 having different optical path lengths focus on different points through the thickness of the optical recording medium 23 and interference fringes 3 are formed as a result of interference between the information beam and the reference beam, whereby information is recorded.

Following the recording, the optical recording medium 23 or the information beam and the reference beam 34 are horizontally shifted by a specific pitch. At this position, the information beam and the reference beam 34 are emitted from the spatial light modulator 20. A half of them enter the recording layer 4 as they are while the other half have their optical path lengths adjusted by the focal length adjusting member 21a and enter the recording layer 4. Then, information is recorded in the recording layer 4 in parts in the same manner as described above.

Also in Embodiment 2, uneven consumption of the material of the recording layer 4 is reduced, thereby increasing the recording density and allowing high multiple recording.

—Fixing of the Recording—

The recorded region is irradiated with the fixing light at least within 28 hours after the interference images 3 are recorded in the recording layer 4 to fix the recorded interference images 3.

<Optical Reproduction>

Then, as shown in FIG. 2, a laser beam is emitted to the recording medium 23 on which the information is recorded. Reproduction light 34 is generated from the laser beam by the spatial light modulator 20. The optical path length of a half of the reproduction beam 34 is adjusted by the focal length adjusting member 21a provided on the optical path by the same adjustment rate L as during the recording to generate two reproduction beams 34 having different optical path lengths. Collected by the objective lens 12, the two reproduction beams 34 enter the optical recording medium 23 and irradiate the interference images 3 recorded at different positions through the thickness of the recording layer 4. Upon the irradiation, the diffracted lights 35 are each generated from the interference images 3. The diffracted lights 35 reflected by the reflection film 2 emitted from the optical recording medium 23 and pass through the objective lens 12, are reflected by the half mirror 17, and received by the light receiving unit 14. Before received, the diffracted light 35 generated from the reproduction beam 34 having the optical path length not adjusted by the focal length adjusting member 21 is adjusted by the focal length adjusting member 21b on the light receiving unit 14 side. Then, the two diffracted lights 35 focus on the same plane of the light receiving unit 14 when received. The light receiving unit 14 reproduces information corresponding to the interference images 3 in an equal, enlarged, or reduced size.

With the optical path lengths of the reproduction beam 34 and diffracted light 35 being adjusted by the focal length adjusting plate 21a and 21b on the spatial light modulator 20 side and on the light receiving unit 14 side, a fine reproduction of the recorded information, not out-of-focus, shifted, or distorted, can be obtained.

EXAMPLES

Hereinafter, the present invention will be further described in detail referring to specific Examples of the present invention, however, the present invention is not limited to the disclosed Examples.

Example 1

The optical recording medium was produced in the following procedure to implement the optical recording method of the present invention.

—Production of Optical Recording Medium—

The optical recording medium of Example 1 had a first substrate 5, a second substrate 1, and a recording layer 4 as shown in FIG. 1.

For a second substrate 5, a conventional polycarbonate resin substrate used for DVD+RW and having a diameter of 120 mm and a thickness 0.6 mm was used. The second substrate 5 had a reflection film 2 having a thickness of 200 nm on the surface.

The reflection film 2 could be formed by DC magnetron sputtering using aluminum (Al). A polycarbonate film having a thickness of 100 μm was bonded onto the reflection film 2 using an ultraviolet curable resin to form a gap layer (not-shown).

A photopolymer coating solution having the composition below was prepared as the material of the recording layer.

—Composition of Photopolymer Coating Solution—

| | |
|---|---|
| di(urethaneacrylate) oligomer (ex. Echo Resins, ALU-351) | 59 parts by mass |
| isobornyl acrylate | 30 parts by mass |
| vinyl benzoate | 10 parts by mass |
| polymerization initiator (ex. Chiba Special Chemicals, IRGACURE 784) | 1 part by mass |

The obtained photopolymer coating solution was placed in a heap on the second substrate using a dispenser. The first substrate of polycarbonate resin having a diameter of 12 cm and a thickness of 0.6 mm was pressed against the photopolymer from above to bond the disc edge and the first substrate together.

The disc edge was provided with a flange to give the photopolymer layer a thickness of 500 μm. The thickness of the photopolymer layer was determined by the first substrate attached thereto and overflowing extra photopolymer was removed.

In this way, the optical recording medium of Example 1 was produced. FIG. 2 was a schematic cross-sectional view showing an embodiment similar to that of Example 1.

<Recording Information in the Recording Layer>

Information was recorded on the optical recording medium using an optical recording/reproducing apparatus having two spatial light modulators 20a and 20b between the source of a laser beam and the optical recording medium 23 and a focal length adjusting member 21 between the optical recording medium 23 and the light receiving unit 14 as shown in FIG. 1. The spatial light modulators 20a and 20b were apart from each other by a distance l=0.2 mm in the light emission direction and by a distance d=0.1 mm in the intersecting direction.

The total width D of the spatial light modulators 20a and 20b was 5 mm and d/D=1/50.

The focal length adjusting member 21 was an acrylic lens having a refractive index of 1.5 and a thickness of 0.4 mm. The optical path length adjustment rate L' was 0.2 mm.

Using the above described optical recording/reproducing apparatus, the recording layer 4 of the optical recording medium 23 was irradiated with a semiconductor laser with irradiation energy of approximately 50 mJ/cm² for 100 nsec. With the irradiation, the two spatial light modulators 20c and 20d generated information beams and reference beams 34 having different optical path lengths, the optical recording medium 23 was irradiated with the information beams and reference beams 34 to focus on different points through the thickness of the recording layer 4 as shown in FIG. 1. Interference fringes 3 were formed as a result of interference between the information beam and the reference beam, whereby information was recorded.

In Example 1, 50-fold or higher multiple recording was available.

According to the optical recording method of Example 1, as described above, the information beam and the reference beam were divided into two and the interference fringes were formed with the optical density being distributed. Therefore, the recording layer material near the vertexes of the inverted cone-shaped interference fringes was not excessively consumed, and the subsequent recording was performed with a small shift for multiple recording. Furthermore, multiple recording through the thickness was also available. Consequently, the recording density in the recording layer was increased and the recording capacity of an optical recording medium was significantly increased.

<Evaluation of Recording Reproduction Quality>

The recording reproduction quality was evaluated using the same optical recording/reproducing apparatus as the one used in the optical recording shown in FIG. 1. In the optical recording/reproducing apparatus, a laser beam for optical reproducing was emitted and the laser beam was modulated by the spatial light modulators 20a and 20b to generate two reproduction beams 34 having different optical path lengths to the optical recording medium. The two reproduction beams 34 irradiated and focused on the two interference images 3 recorded at different positions through the thickness during the optical recording. Two diffracted lights 35 having different optical path lengths were generated from the interference images 3. One diffracted light 35 was modulated by the focal length adjusting member 21. Then, the two diffracted lights 35 focused on the same plane of the light receiving unit 14 for reproduction. According to the optical reproducing method of Example 1, the number of errors during the reproduction of the recorded information was 10 per frame or less, ensuring fewer errors.

Example 2

<Recoding Information in Recording Layer>

Information was optically recorded on the same optical recording medium as in Example 1 using an optical recording/reproducing apparatus provided with a spatial light modulator 20, a focal length adjusting member 21a (acrylic lens, refractive index of 1.5, and thickness of 0.5 mm) having a width nearly half the spatial light modulator 20 between the light source and the optical recording medium 23, and a focal length adjusting member 21b (acrylic lens, refractive index of 1.5, and thickness of 0.5 mm) between the optical recording medium 23 and the light receiving unit 14 as shown in FIG. 2. The focal length adjusting members 21a and 21b serve to shorten the optical path lengths of lights passing through them smaller by the adjustment rate L=0.25 mm.

Using the above described optical recording/reproducing apparatus, the recording layer 4 of the optical recording medium 23 was irradiated with a semiconductor laser with irradiation energy of approximately 50 mJ/cm² for 100 nsec. With the irradiation, information beam and reference beam 34 were generated by the spatial light modulator 20 to irradiate the optical recording medium 23. The optical path lengths of a part of them were adjusted by the focal length adjusting member 21a before the optical recording medium 23 was irradiated therewith. Therefore, the information beam and the reference beam 34 focused on different points through the thickness of the recording layer 4. Then, interference fringes 3 were formed as a result of interference between the information beam and the reference beam 34, whereby information was recorded.

In Example 2, 50-fold or higher multiple recording was available.

According to the optical recording method of Example 2, as described above, the information beam and the reference beam were divided into two and the interference fringes were formed with the optical density being distributed. Therefore, the recording layer material near the vertexes of the inverted cone-shaped interference fringes was not excessively consumed and the subsequent recording was performed with a small shift for multiple recording. Furthermore, multiple recording through the thickness was also available. Consequently, the recording density in the recording layer was increased and the recording capacity of an optical recording medium was significantly increased.

<Evaluation of Recording Reproduction Quality>

The recording reproduction quality was evaluated using the same optical recording/reproducing apparatus as the one used in the optical recording shown in FIG. 2. In the optical recording/reproducing apparatus, a laser beam for optical reproducing was emitted and the laser beam was modulated by the spatial light modulator 20 to generate reproduction beam 34 for irradiating the optical recording medium. The optical path length of a part of the reproduction beam 34 was adjusted before it irradiated the optical recording medium 23. Therefore, the reproduction beams 34 focused on and irradiate the two interference images 3 recorded at different positions through the thickness during the optical recording. Two diffracted lights 35 having different optical path lengths were generated from the interference images 3. One diffracted light 35 was modulated by the focal length adjusting member 21b. Then, when received, the two diffracted lights 35 focused on the same plane of the light receiving unit 14 for production. According to the optical reproducing method of Example 2, the number of errors during the reproduction of the recorded information was 10 per frame or less, ensuring fewer errors.

Comparative Example 1

<Recoding Information in the Recording Layer>

Using the same optical recording medium as in Example 1, information was recorded in the same manner as in Example 1 except that one spatial light modulator was used and the adjustment to yield information beams and reference beams having different optical path lengths was omitted.

Figure 8:
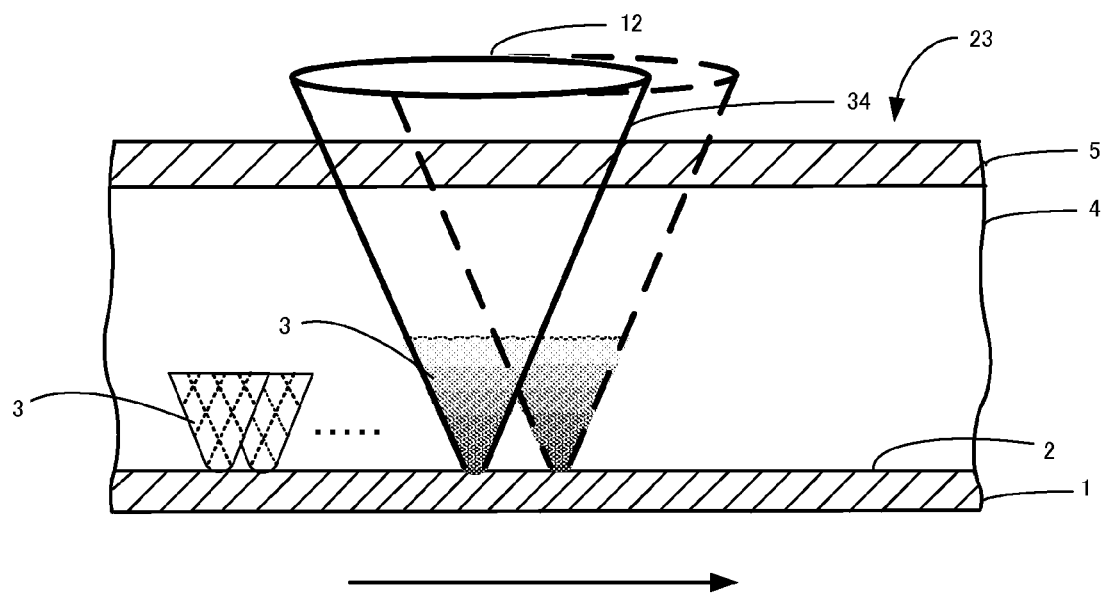
FIG. 8 is an explanatory illustration showing an embodiment of the optical system of the related art optical recording method.

In Comparative Example 1, the adjustment to yield information beams and reference beams having different optical path lengths was omitted. Then, as shown in FIG. 8, the optical density was high near the vertexes of interference images 3 and the recording layer material was exhausted. A subsequent interference fringe 3 could not overwritten in this position. The recording density of the recoding layer 4 was reduced and 50-fold or lower multiple recording was available. The recording capacity of a recording medium could not be increased. In FIG. 8, the arrow indicates the circumferential direction of the optical recording medium.

<Evaluation of Recording Reproduction Quality>

The recording reproduction quality of Comparative Example 1 was evaluated using the same optical recording/reproducing apparatus used in the optical recording. The optical path length of the reproduction beam was not adjusted during the reproduction, either.

When the information recorded by the related art recording method was reproduced by the conventional optical reproducing method, the number of errors during the reproduction was 10 per frame or less. Although a small number of errors occurred, the reproduction was performed for a smaller recording capacity.

The present invention resolves the related art problems and provides an optical recording method and an optical recording apparatus for holographically recording information in which uneven consumption of the material through the thickness of the recording layer during recording is reduced so as to achieve high density recording and an increased recording capacity, an optical recording medium for recording by the optical recording method so that information recorded in a large volume and at high density is reproduced with efficiency, and an optical reproducing method and an optical reproducing apparatus for reproducing information recorded by the optical recording method in an efficient and excellent manner.

The optical recording method and optical recording apparatus of the present invention reduces uneven consumption of the material through the thickness of a recording layer during recording so as to achieve high density recording and an increased recording capacity and, therefore, is preferably used in a holographic optical recording method and optical recording apparatus capable of high multiple recording.

The optical recording medium of the present invention allows information recorded in a high volume and high density to be reproduced with efficiency and is preferably used for relatively thin plane holograms for recording two-dimensional information and volume holograms for recording a large volume of information such as three-dimensional images, of a transmission type or reflection type. The optical recording medium of the present invention is extensively used as media for recording or reproducing various holograms such as amplitude, phase, blade, and complex amplitude holograms, and as media for recording or reproducing information used in CD, DVD, BD/HD DVD, magnetic tapes, computer backup tapes, and broadcast tapes.

The optical reproducing method and optical reproducing apparatus of the present invention can reproduce a high density and large recording capacity optical recording medium in an efficient and fine manner and is preferably used in holographic optical reproducing method and optical reproducing apparatus capable of high multiple recording.

What is claimed is:

1. An optical recording method, comprising:
    irradiating an optical recording medium with an information beam and a reference beam,
    dividing at least one of the information beam and the reference beam into two or more between a light source of the information beam and reference beam and the optical recording medium, and
    adjusting the optical path lengths of the divided information beams and reference beams so that they focus on points different from each other through the thickness of the recording layer,
    wherein the optical recording medium comprises a recording layer in which information is holographically recorded and the optical path length is adjusted by 1 μm to 1,000 μm.

2. The optical recording method according to claim 1, wherein the optical path lengths are adjusted by at least one optical path length adjusting unit provided between the light source of the information beam and reference beam and the optical recording medium.

3. The optical recording method according to claim 2, wherein the optical path length adjusting unit has on its light emitting surface points that are at different distances from the optical recording medium.

4. The optical recording method according to claim 2, wherein at least two of the optical path length adjusting units are provided at different positions in the light emission direction.

5. The optical recording method according to claim 2, wherein the optical path length adjusting unit comprises a focal point adjusting member.

6. The optical recording method according to claim 2, wherein the optical path length adjusting unit comprises a spatial light modulator.

7. The optical recording method according to claim 4, wherein a distance "d" in the direction intersecting with the light emission direction between two or more of the optical path length adjusting units provided at different positions, and the total width D across all optical path length adjusting units satisfy the equation, $d/D = 1/1{,}000$ to $1/2$.

8. The optical recording method according to claim 1, wherein the information beam and the reference beam are emitted with their optical axes being coaxially aligned.

9. An optical recording apparatus, comprising:
    a light source,
    an optical recording unit configured to record information on an optical recording medium having a recording layer in which information is holographically recorded by irradiating the optical recording medium with an information beam and a reference beam, and a unit configured to divide at least one of the information beam and the reference beam into two or more between the light source of the information beam and reference beam and the optical recording medium and adjust the optical path lengths of the divided information beams and reference beams so that they focus on points different from each other through the thickness of the recording layer, wherein the optical path length is adjusted by 1 μm to 1,000 μm.

10. The optical recording apparatus according to claim 9, wherein at least one optical path length adjusting unit is provided between the light source of the information beam and reference beam and the optical recording medium, and the optical path length adjusting unit is configured to adjust the optical path lengths.

11. An optical reproducing method, comprising:

irradiating with a reproduction beam that is the same as a reference beam used during recording an interference image formed on a recording layer in an optical recording medium by an optical recording method, receiving diffracted light generated upon the irradiation by a light receiving unit, and reproducing recorded information based on the interference image, wherein the optical recording method comprises irradiating the optical recording medium with an information beam and a reference beam, dividing at least one of the information beam and the reference beam into two or more between a light source of the information beam and reference beam and the optical recording medium, and adjusting the optical path lengths of the divided information beams and reference beams so that they focus on points different from each other through the thickness of the recording layer, wherein the optical recording medium comprises the recording layer, the recorded information is holographically recorded in the recording layer by the optical recording method, and the optical path length is adjusted by 1 μm to 1,000 μm.

12. The optical reproducing method according to claim 11, wherein at least any one of the following is performed, the reproduction beam is divided into two or more between the light source of the reproduction beam and the optical recording medium, and the optical path lengths of the divided reproduction beams are adjusted so that they focus on points different from each other through the thickness of the recording layer; and the optical path lengths of diffracted lights each having a different optical path length between the optical recording medium and the light receiving unit are adjusted so that they focus on the same plane of the light receiving unit.

13. An optical reproducing apparatus, comprising:

a light source, a light receiving unit, and an optical reproducing unit configured to irradiate with a reproduction beam that is the same as a reference beam used during recording an interference image formed on a recording layer in an optical recording medium by an optical recording apparatus, receive diffracted lights generated upon the irradiation at the light receiving unit to reproduce recorded information based on the interference image, any of the following units, a unit configured to divide a reproduction beam into two or more between the light source of the reproduction beam and optical recording medium and adjust the optical path lengths of the divided reproduction beams so that they focus on points different from each other through the thickness of a recording layer; and a unit configured to adjust the optical path lengths of diffracted lights each having a different optical path length between the optical recording medium and the light receiving unit so that they focus on the same plane of the light receiving unit, wherein the optical recording apparatus comprises a light source, an optical recording unit configured to record information on an optical recording medium having a recording layer in which information is holographically recorded by irradiating the optical recording medium with an information beam and a reference beam, and a unit configured to divide at least one of the information beam and the reference beam into two or more between the light source of the information beam and reference beam and the optical recording medium and adjust the optical path lengths of the divided information beams and reference beams so that they focus on points different from each other through the thickness of the recording layer, and wherein the optical path length is adjusted by 1 μm to 1,000 μm.

14. The optical reproducing apparatus according to claim 13, wherein at least one optical path length adjusting unit is provided between the light source of the information beam and reference beam and the optical recording medium, and the optical path length adjusting unit is configured to adjust the optical path lengths.

* * * * *